United States Patent
Deng et al.

(10) Patent No.: US 11,418,271 B2
(45) Date of Patent: Aug. 16, 2022

(54) METHOD FOR MEASURING AND FEEDING BACK CHANNEL STATE INFORMATION AND DEVICE

(71) Applicant: HUAWEI TECHNOLOGIES CO., LTD., Guangdong (CN)

(72) Inventors: Na Deng, Shenzhen (CN); Ting Wang, Shanghai (CN); Haibao Ren, Shanghai (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 126 days.

(21) Appl. No.: 16/271,026

(22) Filed: Feb. 8, 2019

(65) Prior Publication Data

US 2019/0190630 A1 Jun. 20, 2019

Related U.S. Application Data

(63) Continuation of application No. PCT/CN2017/083363, filed on May 5, 2017.

(30) Foreign Application Priority Data

Aug. 11, 2016 (CN) .......................... 201610658688.1

(51) Int. Cl.
*H04B 7/06* (2006.01)
*H04L 5/00* (2006.01)
(Continued)

(52) U.S. Cl.
CPC .......... *H04B 17/382* (2015.01); *H04B 7/022* (2013.01); *H04B 7/024* (2013.01); *H04B 7/0456* (2013.01);
(Continued)

(58) Field of Classification Search
CPC ...... H04B 17/382; H04B 7/022; H04B 7/024; H04B 7/0456; H04B 7/06; H04B 7/0626;
(Continued)

(56) References Cited

U.S. PATENT DOCUMENTS 9,774,426 B2 * 9/2017 Seo ........................ H04L 1/0027
2010/0177746 A1 7/2010 Gorokhov et al.
(Continued)

FOREIGN PATENT DOCUMENTS

CN 104081813 A 10/2014
CN 104219724 A 12/2014
(Continued)

OTHER PUBLICATIONS

ZTE Corporation, ZTE Microelectronics,"Potential Enhancements for Joint Transmission",3GPP TSG RAN WG1 Meeting #85 R1-164302,Nanjing, China, May 23-27, 2016,total 3 pages.
(Continued)

*Primary Examiner* — Christopher M Crutchfield
*Assistant Examiner* — Tito Q Pham
(74) *Attorney, Agent, or Firm* — Womble Bond Dickinson (US) LLP

(57) ABSTRACT

A method for measuring and feeding back channel state information and a device is provided. The method includes: sending, by a first network side device, channel state information (CSI) measurement configuration information to user equipment, where the CSI measurement configuration information includes coordination indication information indicating that the first network side device and at least one second network side device are in a coordination relationship, receiving, by the user equipment, the CSI measurement configuration information from the first network side device, performing measurement based on the CSI measurement configuration information, and feeding back at least one
(Continued)

group of CSI to the first network side device based on the measurement configuration information. Accuracy of fed back content and further facilitating scheduling of a base station is improved.

15 Claims, 4 Drawing Sheets

(51) Int. Cl.
| | |
|---|---|
| *H04B 7/022* | (2017.01) |
| *H04B 7/024* | (2017.01) |
| *H04B 7/0456* | (2017.01) |
| *H04W 24/10* | (2009.01) |
| *H04B 7/04* | (2017.01) |
| *H04B 17/382* | (2015.01) |

(52) U.S. Cl.
CPC ............. *H04B 7/06* (2013.01); *H04B 7/0626* (2013.01); *H04B 7/0632* (2013.01); *H04L 5/0048* (2013.01); *H04L 5/0051* (2013.01); *H04W 24/10* (2013.01); *H04B 7/04* (2013.01)

(58) Field of Classification Search
CPC ....... H04B 7/0632; H04B 7/04; H04L 5/0048; H04L 5/0051; H04W 24/10
See application file for complete search history.

(56) References Cited

U.S. PATENT DOCUMENTS

| | | | |
|---|---|---|---|
| 2012/0106388 A1 | 5/2012 | Shimezawa et al. | |
| 2012/0113897 A1* | 5/2012 | Thiele | H04B 7/024 370/328 |
| 2012/0218968 A1 | 8/2012 | Kim et al. | |
| 2013/0039199 A1* | 2/2013 | Liao | H04B 7/024 370/252 |
| 2013/0196675 A1 | 8/2013 | Xiao et al. | |
| 2013/0301548 A1* | 11/2013 | Etemad | H04W 52/0235 370/329 |
| 2014/0086084 A1* | 3/2014 | Bi | H04L 1/0027 370/252 |
| 2014/0286182 A1 | 9/2014 | Chen et al. | |
| 2014/0307703 A1* | 10/2014 | Gaal | H04L 5/0048 370/330 |
| 2015/0024776 A1* | 1/2015 | Wegmann | H04W 24/02 455/456.1 |
| 2015/0381254 A1* | 12/2015 | Liang | H04B 7/0619 370/329 |
| 2016/0112177 A1 | 4/2016 | Zheng et al. | |
| 2016/0150512 A1* | 5/2016 | Zhang | H04W 72/0446 370/329 |
| 2016/0248560 A1 | 8/2016 | Kim et al. | |
| 2019/0173549 A1* | 6/2019 | Liang | H04L 41/0803 |

FOREIGN PATENT DOCUMENTS

| | | |
|---|---|---|
| CN | 104641678 A | 5/2015 |
| CN | 104811288 A | 7/2015 |
| CN | 104869649 A | 8/2015 |

OTHER PUBLICATIONS

Intel Corporation,"CSI feedback enhancements for non-coherent JT",3GPP TSG RAN WG1 Meeting #85 R1-164168,Nanjing, China May 23-27, 2016,total 2 pages.

Intel Corporation, ZTE,"New SID: Further enhancements to Coordinated Multi-Point Operation",3GPP TSG RAN Meeting #71 RP-160665(revision of RP-160590),Göteborg, Sweden, Mar. 7-10, 2016, total 7 pages.

3GPP TS 36.331 V13.0.0 (Dec. 2015);3rd Generation Partnership Project;Technical Specification Group Radio Access Network;Evolved Universal Terrestrial Radio Access (E-UTRA);Radio Resource Control (RRC);Protocol specification(Release 13),total 507 pages.

3GPP TS 36.213 V13.2.0 (Jun. 2016);3rd Generation Partnership Project;Technical Specification Group Radio Access Network;Evolved Universal Terrestrial Radio Access (E-UTRA);Physical layer procedures(Release 13),total 381 pages.

3GPP TS 36.212 V13.2.0 (Jun. 2016);3rd Generation Partnership Project;Technical Specification Group Radio Access Network;Evolved Universal Terrestrial Radio Access (E-UTRA);Multiplexing and channel coding(Release 13),total 140 pages.

Huawei et al: "Potential enhancement for FeCoMP with ideal backhaul links", 3GPP Draft; R1-164086,May 14, 2016, XP051096598, total 3 pages.

* cited by examiner

METHOD FOR MEASURING AND FEEDING BACK CHANNEL STATE INFORMATION AND DEVICE

CROSS-REFERENCE TO RELATED APPLICATIONS

This application is a continuation of International Application No. PCT/CN2017/083363, filed on May 5, 2017, which claims priority to Chinese Patent Application No. 201610658688.1, filed on Aug. 11, 2016. The disclosures of the aforementioned applications are hereby incorporated by reference in their entireties.

TECHNICAL FIELD

The present invention relates to the field of communications technologies, and specifically, to a method for measuring and feeding back channel state information and a device.

BACKGROUND

A next generation mobile communications system requires large-capacity and high-quality data transmission. A multiple-input multiple-output (MIMO) technology is considered as one of key technologies to implement future high-speed data transmission, and has wide application prospect in fourth generation and fifth generation mobile communications systems. In the MIMO technology, a transmit end and a receive end respectively use a plurality of transmit antennas and a plurality of receive antennas to transmit and receive signals, so as to improve communication quality. A plurality of transmit antennas of a centralized MIMO system are centrally distributed on a base station end. However, a plurality of transmit antennas of a distributed MIMO system are distributed at different geographical locations. Pairs of transmit and receive links of the distributed MIMO system are more independent, and have advantages of larger capacity, lower power consumption, better coverage, and low electromagnetic harm to people. Therefore, the distributed MIMO system is considered as one of candidate solutions of a future communications system. In the distributed MIMO system, using a coordinated multipoint diversity transmission method may be considered to improve signal reliability of an edge user, and using a coordinated multipoint multi-stream transmission method may be considered to improve a cell throughput.

A coordinated multipoint transmission (CoMP) is considered an effective method for resolving problems of inter-cell interference and increasing an edge user throughput. In the CoMP technology, a plurality of neighboring cells may jointly perform processing or coordinate edge users to avoid interference and increase the edge user throughput. A downlink CoMP technology mainly includes joint transmission, coordinated scheduling and beamforming, and dynamic point selection/dynamic point blanking. To implement such CoMP scheduling, a serving base station needs to know a condition of a downlink channel from each station to user equipment. The serving base station sends a specified channel state information-reference signal (CSI-RS) to the user equipment (UE) to instruct the UE to measure and feed back channel state information (CSI), so as to obtain the condition of the downlink channel from each station to the user equipment.

The specified CSI-RS includes a plurality of CSI processes configured by the serving base station for the UE, and different CSI processes are independent of each other. The UE measures and feeds back corresponding CSI based on an assumption of single-cell transmission. In other words, the UE measures and feeds back one piece of CSI based on one CSI process. However, coordinated transmission such as coordinated multipoint diversity transmission and coordinated multipoint multi-stream transmission is data transmission jointly implemented by a plurality of coordinating stations, and data is correlated to each other. If measurement is performed still based on the assumption of single-cell transmission in the coordinated transmission, CSI fed back by the UE cannot reflect relevance between data in the coordinated transmission. As a result, the fed back CSI is inconsistent with an actual case, fed back content is incorrect, scheduling of the base station is affected, and transmission performance degrades.

SUMMARY

Embodiments of the present invention provide a method for measuring and feeding back channel state information and a device, so that measurement is performed based on a coordination relationship between a plurality of network side devices. This can improve accuracy of fed back content and further facilitate scheduling of a base station.

A first aspect of the embodiments of the present invention provides a method for measuring and feeding back channel state information, including:

sending, by a first network side device, channel state information CSI measurement configuration information to user equipment, where the CSI measurement configuration information includes coordination indication information, and the coordination indication information indicates that the first network side device and at least one second network side device are in a coordination relationship; and receiving, by the first network side device, at least one group of CSI fed back by the user equipment based on the CSI measurement configuration information.

According to the first aspect of the embodiments of the present invention, the first network side device notifies the user equipment of a coordination relationship between a plurality of network side devices by using the CSI measurement configuration information, and instructs the user equipment to perform measurement based on the CSI measurement configuration information, so that a result measured by the user equipment is more consistent with an actual case. This improves accuracy of fed back content and further facilitates scheduling of a base station.

In one embodiment, the first network side device configures one piece of CSI process information for the user equipment, where the one piece of CSI process information is used for configuration of the CSI measurement configuration information. In other words, the CSI measurement configuration information is configured in the CSI process information, and the CSI measurement configuration information is notified to the user equipment by using the CSI process information.

In one embodiment, the one piece of CSI process information includes non-zero power channel state information-reference signal CSI-RS resource information of each of the at least one second network side device. In other words, the CSI process information includes information about another network side device, and the information about the another network side device is associated in the CSI process information, so that the user equipment is informed, by using the CSI process information, that the first network side device is associated with which second network side devices.

In one embodiment, non-zero power CSI-RS resource information of each second network side device included in the one piece of CSI process information is used to indicate the coordination indication information.

In one embodiment, non-zero power CSI-RS resource information of each second network side device included in non-zero power CSI-RS resource information indication signaling in the one piece of CSI process information is used to indicate the coordination indication information.

In one embodiment, non-zero power CSI-RS resource information of each second network side device included in interference measurement resource information indication signaling in the one piece of CSI process information is used to indicate the coordination indication information.

In one embodiment, the one piece of CSI process information further includes non-zero power CSI-RS type indication information, the non-zero power CSI-RS type indication information is used to indicate that a non-zero power CSI-RS corresponding to non-zero power CSI-RS resource information of the first network side device is a non-precoded type or a precoded type, and a non-zero power CSI-RS corresponding to non-zero power CSI-RS resource information of each second network side device is the non-precoded type or the precoded type. In other words, non-zero power CSI-RSs corresponding to non-zero power CSI-RS resource information of network side devices may be the same or different, and a specific type is indicated by using the non-zero power CSI-RS type indication information.

In one embodiment, if the non-zero power CSI-RS type indication information corresponding to the non-zero power CSI-RS resource information of the first network side device is the precoded type, the first network side device configures at least one non-zero power CSI-RS resource information identifier. A non-zero power CSI-RS resource is corresponding to the non-zero power CSI-RS resource information identifier is used to perform at least one of channel measurement and interference measurement.

In one embodiment, CSI-RS pattern information in non-zero power CSI-RS resource information of each second network side device, included in enhanced signaling in non-zero power CSI-RS resource information indication signaling in the one piece of CSI process information is used to indicate the coordination indication information.

In one embodiment, the first network side device configures at least two pieces of CSI process information for the user equipment, that is, configures one piece of CSI process information for each network side device. The at least two pieces of CSI process information are used for configuration of the CSI measurement configuration information.

In one embodiment, at least one of the at least two pieces of CSI process information includes the coordination indication information. The coordination indication information includes a process identifier of CSI process information other than CSI process information including the coordination indication information in the at least two pieces of CSI process information. In other words, information about a network side device different from a network side device corresponding to the CSI process information including the coordination indication information is associated in the at least one piece of CSI process information. The at least one piece of CSI process information may be each of the at least two pieces of CSI process information, or one or several of the at least two pieces of CSI process information.

In one embodiment, a process identifier that is of CSI process information other than CSI process information including the coordination indication information in the at least two pieces of CSI process information and that is included in interference measurement resource information indication signaling in the at least one piece of CSI process information is used to indicate the coordination indication information.

In one embodiment, a process identifier of CSI process information other than CSI process information including the coordination indication information in the at least two pieces of CSI process information, included in non-zero power CSI-RS resource information indication signaling in the at least one piece of CSI process information is used to indicate the coordination indication information.

In one embodiment, the CSI measurement configuration information further includes measurement type indication information. The measurement type indication information is used to instruct the user equipment to perform measurement based on the coordination indication information and a measurement type indicated by the measurement type indication information. The measurement type is related to a coordinated transmission mode, and the coordinated transmission mode includes at least one of coordinated multipoint multi-stream transmission, coordinated multipoint diversity transmission, and interference coordination transmission. The user equipment performs measurement based on a measurement type, so that measurement is more targeted.

In one embodiment, the CSI measurement configuration information further includes feedback indication information, used to instruct the user equipment to feed back the at least one group of CSI to the first network side device. The feedback indication information includes feedback group quantity indication information and feedback content indication information. The feedback group quantity indication information is used to indicate a group quantity of the at least one group of CSI, and the feedback content indication information is used to indicate content of the at least one group of CSI.

In one embodiment, the feedback group quantity indication information indicates that there are at least two groups of CSI, and the feedback content indication information indicates that content of the at least two groups of CSI includes CSI corresponding to the first network side device and CSI corresponding to each of the at least one second network side device. Compositional elements of the CSI include at least one of channel quality information, precoding matrix information, and rank information. In other words, the user equipment is instructed to feed back one group of CSI for each network side device.

In one embodiment, the feedback group quantity indication information indicates that there are at least two groups of CSI, and the feedback content indication information indicates that content of the at least two groups of CSI includes a CSI group corresponding to the first network side device and a CSI group corresponding to each of the at least one second network side device. A CSI group corresponding to a third network side device includes at least one CSI sub-group. The third network side device is any one of the first network side device and at least one second network side device. Each of the at least one CSI sub-group includes at least one of precoding matrix information, rank information, and channel quality information. The precoding matrix information and the rank information are measured based on the third network side device. The channel quality information is measured by using precoding matrix information of a fourth network side device as one of interference sources. The precoding matrix information of the fourth network side device is precoding matrix information measured based on non-zero power CSI-RS resource information corresponding to the fourth network side device. The fourth network side device is any one of other network side devices, other than the third network side device, that are indicated in the coordination indication information. In other words, the user equipment is instructed to feed back one group of CSI for each network side device, but the group of CSI is measured for which an interference source is considered.

In one embodiment, the feedback group quantity indication information indicates that there are at least two groups of CSI, at least one group of CSI, or one group of CSI, and the feedback content indication information indicates that content of the at least one group of CSI includes at least one group of first CSI and/or second CSI corresponding to the first network side device. Any group of the at least one group of first CSI includes at least one piece of CSI measured based on at least one interference source of one second network side device. The at least one interference source is generated based on at least one piece of precoding matrix information corresponding to the second network side device. The second CSI is CSI measured without regarding each second network side device as an interference source. Compositional elements of the CSI include at least one of channel quality information, precoding matrix information, and rank information; or any group of the at least one group of first CSI includes at least one piece of CSI measured based on interference sources of at least two second network side devices. The interference source is generated based on any piece of at least one piece of precoding matrix information corresponding to each of the at least two second network side devices. In other words, the user equipment is instructed to perform feedback for the first network side device, and an interference source of the second network side device needs to be considered for fed back content.

In one embodiment, the feedback group quantity indication information indicates that there are at least two groups of CSI, and the feedback content indication information indicates that content of the at least two groups of CSI includes at least one group of first CSI and at least one group of second CSI that are corresponding to the first network side device. The at least one group of first CSI is CSI measured by using specified precoding matrix information corresponding to each second network side device as one of interference sources, and the second CSI is CSI measured without using the specified precoding matrix information corresponding to each second network side device as one of interference sources. The specified precoding matrix information is precoding matrix information measured based on non-zero power CSI-RS resource information of the corresponding second network side device. Compositional elements of the CSI include at least one of channel quality information, precoding matrix information, and rank information. In other words, the user equipment is instructed to perform feedback for the first network side device, and the specified precoding matrix information of the second network side device needs to be considered for fed back content.

In one embodiment, the feedback group quantity indication information indicates that there are at least two groups of CSI, and the feedback content indication information indicates that content of each group of the at least two groups of CSI includes precoding matrix information and equivalent channel quality information; or the feedback group quantity indication information indicates that there is one group of CSI, and the feedback content indication information indicates that content of the group of CSI includes the equivalent channel quality information and at least two pieces of precoding matrix information.

The equivalent channel quality information is channel quality information obtained by the user equipment by performing equivalent processing based on a transmit-diversity related transmission mode. In other words, feedback is performed in a multipoint diversity transmission mode.

In one embodiment, when the feedback group quantity indication information indicates that there are at least two groups of CSI, and content, indicated by the feedback content indication information, of the at least one group of CSI further includes difference information. The difference information includes any group of CSI of the at least two groups of CSI and difference information between the any group of CSI and another group of CSI other than the any group of CSI. The first network side device may perform scheduling based on the difference information.

In one embodiment, the feedback indication information further includes order indication information. The order indication information is used to indicate a feedback order of the at least one group of CSI, for example, indicate that feedback is performed according to an order of values of process identifiers of CSI process information or the like.

In one embodiment, the CSI measurement configuration information further includes channel quality feedback indication information. The channel quality feedback indication information is used to indicate that the user equipment feeds back channel quality information based on single code word transmission.

A second aspect of the embodiments of the present invention provides a method for measuring and feeding back channel state information, including:

receiving, by user equipment, CSI measurement configuration information sent by a first network side device, where the CSI measurement configuration information includes coordination indication information, and the coordination indication information indicates that the first network side device and at least one second network side device are in a coordination relationship;

performing, by the user equipment, measurement based on the CSI measurement configuration information; and feeding back, by the user equipment, at least one group of CSI to the first network side device based on the CSI measurement configuration information.

In the second aspect of the embodiments of the present invention, the user equipment performs measurement and feedback based on the CSI measurement configuration information sent by the first network side device. The CSI measurement configuration information includes the coordination indication information. Therefore, the user equipment performs measurement and feedback based on the coordination relationship indicated by the coordination indication information, so that a measurement result is more consistent with an actual case. This improves accuracy of fed back content and further facilitates scheduling of a base station.

In one embodiment, the coordination indication information is indicated by non-zero power CSI-RS resource information of each of the at least one second network side device included in one piece of CSI process information.

In one embodiment, the coordination indication information is indicated by non-zero power CSI-RS resource information of each of the at least one second network side device included in non-zero power CSI-RS resource information indication signaling in one piece of CSI process information.

In one embodiment, the coordination indication information is indicated by non-zero power CSI-RS resource information of each of the at least one second network side device included in interference measurement resource information indication signaling in one piece of CSI process information.

In one embodiment, the coordination indication information is indicated by CSI-RS pattern information in non-zero power CSI-RS resource information of each of the at least one second network side device, included in enhanced signaling included in non-zero power CSI-RS resource information indication signaling in one piece of CSI process information.

In one embodiment, the coordination indication information is indicated by a process identifier that is of CSI process information other than CSI process information including the coordination indication information in at least two pieces of CSI process information and that is included in interference measurement resource information indication signaling in at least one of the at least two pieces of CSI process information.

In one embodiment, the coordination indication information is indicated by a process identifier of CSI process information other than CSI process information including the coordination indication information of at least two pieces of CSI process information, included in non-zero power CSI-RS resource information indication signaling in at least one of the at least two pieces of CSI process information.

In one embodiment, the CSI measurement configuration information further includes measurement type indication information; and the user equipment performs measurement based on a measurement type indicated by the measurement type indication information and the coordination indication information, where the measurement type is related to a coordinated transmission mode, and the coordinated transmission mode includes at least one of coordinated multipoint multi-stream transmission, coordinated multipoint diversity transmission, and interference coordination transmission.

In one embodiment, the CSI measurement configuration information further includes feedback indication information. The feedback indication information includes feedback group quantity indication information and feedback content indication information. The user equipment determines a group quantity of at least one group of CSI fed back to the first network side device according to the feedback group quantity indication information, determines content of the at least one group of CSI according to the feedback content indication information, and determines to feed back the at least one group of CSI to the first network side device according to the group quantity and content of the at least one group of CSI.

In one embodiment, the feedback indication information includes the feedback group quantity indication information and the feedback content indication information. The feedback group quantity indication information is used to indicate a group quantity of the at least one group of CSI, and the feedback content indication information is used to indicate content of the at least one group of CSI.

In one embodiment, the feedback group quantity indication information indicates that there are at least two groups of CSI, and the feedback content indication information indicates that content of the at least two groups of CSI includes CSI corresponding to the first network side device and CSI corresponding to each of the at least one second network side device. Compositional elements of the CSI include at least one of channel quality information, precoding matrix information, and rank information.

In one embodiment, the feedback group quantity indication information indicates that there are at least two groups of CSI, and the feedback content indication information indicates that content of the at least two groups of CSI includes a CSI group corresponding to the first network side device and a CSI group corresponding to each of the at least one second network side device. A CSI group corresponding to a third network side device includes at least one CSI sub-group. The third network side device is any one of the first network side device and at least one second network side device. Each of the at least one CSI sub-group includes at least one of precoding matrix information, rank information, and channel quality information. The precoding matrix information and the rank information are measured based on the third network side device. The channel quality information is measured by using precoding matrix information of a fourth network side device as one of interference sources. The precoding matrix information of the fourth network side device is precoding matrix information measured based on non-zero power CSI-RS resource information corresponding to the fourth network side device. The fourth network side device is any one of other network side devices, other than the third network side device, that are indicated in the coordination indication information.

In one embodiment, the feedback group quantity indication information indicates that there are at least two groups of CSI, at least one group of CSI, or one group of CSI, and the feedback content indication information indicates that content of the at least one group of CSI includes at least one group of first CSI and/or second CSI corresponding to the first network side device. Any group of the at least one group of first CSI includes at least one piece of CSI measured based on at least one interference source of one second network side device. The at least one interference source is generated based on at least one piece of precoding matrix information corresponding to the second network side device. The second CSI is CSI measured without regarding each second network side device as an interference source. Compositional elements of the CSI include at least one of channel quality information, precoding matrix information, and rank information; or any group of the at least one group of first CSI includes at least one piece of CSI measured based on interference sources of at least two second network side devices. The interference source is generated based on any piece of at least one piece of precoding matrix information corresponding to each of the at least two second network side devices.

In one embodiment, the feedback group quantity indication information indicates that there are at least two groups of CSI, and the feedback content indication information indicates that content of the at least two groups of CSI includes at least one group of first CSI and at least one group of second CSI that are corresponding to the first network side device. The at least one group of first CSI is CSI measured by using specified precoding matrix information corresponding to each second network side device as one of interference sources, and the second CSI is CSI measured without using the specified precoding matrix information corresponding to each second network side device as one of interference sources. The specified precoding matrix information is precoding matrix information measured based on non-zero power CSI-RS resource information of the corresponding second network side device. Compositional elements of the CSI include at least one of channel quality information, precoding matrix information, and rank information.

In one embodiment, the feedback group quantity indication information indicates that there are at least two groups of CSI, and the feedback content indication information indicates that content of each group of the at least two groups of CSI includes precoding matrix information and equivalent channel quality information; or the feedback group quantity indication information indicates that there is one group of CSI, and the feedback content indication information indicates that content of the group of CSI includes the equivalent channel quality information and at least two pieces of precoding matrix information.

The equivalent channel quality information is channel quality information obtained by the user equipment by performing equivalent processing based on a transmit-diversity related transmission mode.

In one embodiment, when the feedback group quantity indication information indicates that there are at least two groups of CSI, and content, indicated by the feedback content indication information, of the at least one group of CSI further includes difference information. The difference information includes any group of CSI of the at least two groups of CSI and difference information between the any group of CSI and another group of CSI other than the any group of CSI.

In one embodiment, the feedback indication information further includes order indication information, and the order indication information is used to indicate a feedback order of the at least one group of CSI.

In one embodiment, the measurement configuration information further includes channel quality feedback indication information. The user equipment feeds back, according to the channel quality feedback indication information, channel quality information based on single code word transmission.

In one embodiment, if non-zero power CSI-RS type indication information corresponding to non-zero power CSI-RS resource information of the first network side device is the precoded type, the first network side device configures at least one non-zero power CSI-RS resource information identifier. A non-zero power CSI-RS resource corresponding to the non-zero power CSI-RS resource information identifier is used to perform at least one of channel measurement and interference measurement, and the user equipment determines non-zero power CSI-RS resource indication information corresponding to the first network side device, and performs channel measurement or interference measurement based on a non-zero power CSI-RS resource corresponding to the non-zero power CSI-RS resource indication information.

In one embodiment, if a non-zero power CSI-RS resource information identifier of the first network side device is configured, the user equipment further feeds back non-zero power CSI-RS resource indication information of the first network side device.

A third aspect of the embodiments of the present invention provides a first network side device, including:

a sending unit, configured to send channel state information CSI measurement configuration information to user equipment, where the CSI measurement configuration information includes coordination indication information, and the coordination indication information indicates that the first network side device and at least one second network side device are in a coordination relationship; and a receiving unit, configured to receive at least one group of CSI fed back by the user equipment based on the CSI measurement configuration information.

The first network side device provided in the third aspect of the embodiments of the present invention is configured to execute the method for measuring and feeding back channel state information provided in the first aspect of the present invention. Reference may be specifically made to description of the first aspect of the embodiments of the present invention, and details are not described herein again.

A fourth aspect of the embodiments of the present invention provides user equipment, including:

a receiving unit, configured to receive CSI measurement configuration information sent by a first network side device, where the CSI measurement configuration information includes coordination indication information, and the coordination indication information indicates that the first network side device and at least one second network side device are in a coordination relationship;

a processing unit, configured to perform measurement based on the CSI measurement configuration information; and a sending unit, configured to feed back at least one group of CSI to the first network side device based on the CSI measurement configuration information.

The user equipment provided in the fourth aspect of the embodiments of the present invention is configured to execute the method for measuring and feeding back channel state information provided in the second aspect of the present invention. Reference may be specifically made to description of the second aspect of the embodiments of the present invention, and details are not described herein again.

A fifth aspect of the embodiments of the present invention provides a system for measuring and feeding back channel state information. The system includes the first network side device provided in the third aspect and the user equipment provided in the fourth aspect.

A sixth aspect of embodiments of the present invention provides a computer storage medium, configured to store a computer software instruction used by the first network side device. The computer software instruction includes a program designed for executing the foregoing aspects.

A seventh aspect of embodiments of the present invention provides a computer storage medium, configured to store a computer software instruction used by the user equipment. The computer software instruction includes a program designed for performing the foregoing aspects.

According to the embodiments of the present invention, the first network side device sends the channel state information CSI measurement configuration information to the user equipment, where the CSI measurement configuration information includes the coordination indication information indicating that the first network side device and the at least one second network side device are in the coordination relationship; the user equipment receives the CSI measurement configuration information sent by the first network side device, performs measurement based on the CSI measurement configuration information, and feeds bask the at least one group of CSI to the first network side device based on the CSI measurement configuration information; and the first network side device receives the at least one group of CSI fed back by the user equipment based on the CSI measurement configuration information, to perform measurement based on a coordination relationship between a plurality of network side devices. This can improve accuracy of fed back content and further facilitate scheduling of a base station.

DESCRIPTION OF EMBODIMENTS

Figure 1:
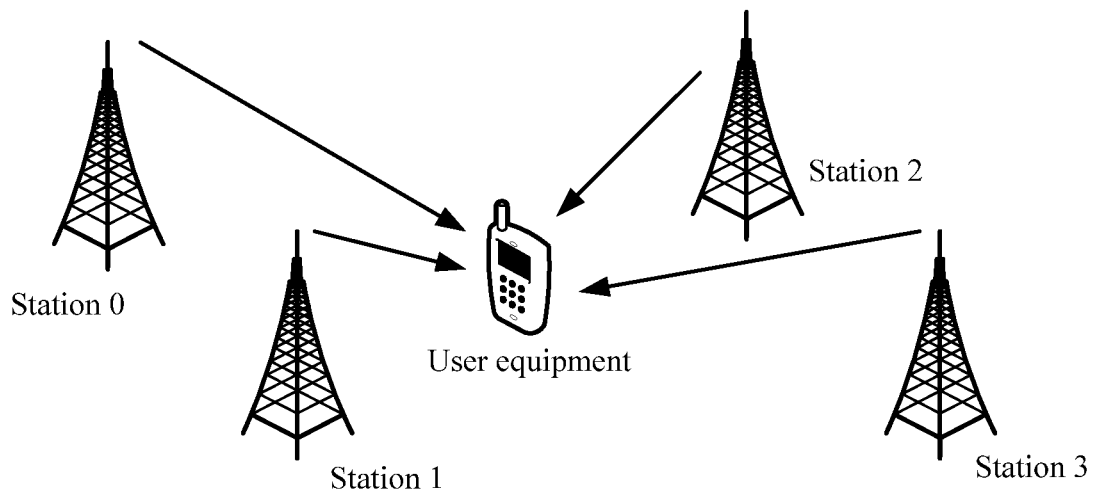
FIG. 1 is a diagram of a network architecture applying embodiments of the present invention.

FIG. 1 is a diagram of a network architecture applying the embodiments of the present invention. The network structure diagram shown in FIG. 1 is a network architecture diagram combining an existing MIMO technology (including a diversity technology used for improving transmission reliability and a multiplexing technology used for increasing a data transmission rate) and coordinated multipoint transmission. In FIG. 1, four stations are included. An area formed by the four stations is referred to as a coordination area, and the four stations coordinately participate in data transmission with UE. It should be noted that, FIG. 1 is merely an optional way. In actual application, it is considered that the coordination area is not limited to include four stations, and the coordination area is not limited to include one UE. A station is corresponding to a transmission point or a network side device in the embodiments of the present invention, and is a transmission point configured to coordinately participate in data transmission with the UE. A station, a transmission point, or a network side device may be a base station, a cell, a radio remote unit (RRU) of a distributed base station, or even a network side device in a future 5G network. A transmission point may be a serving base station or a coordinating base station. The network architecture shown in FIG. 1 may be a network architecture in a Long Term Evolution (LTE) communications system or a network architecture in a future 5G communications system.

The embodiments of the present invention are applied to the network architecture diagram shown in FIG. 1. It is assumed that the four stations shown in FIG. 1 include one serving base station and three coordinating base stations. In the embodiments of the present invention, a first network side device and a second network side device are included. The first network side device may be the serving base station, and the serving base station is configured for scheduling management, resource allocation, and the like. The second network side device is the coordinating base station, configured to transmit data to the UE together with the serving base station.

The embodiments of the present invention are applicable to both a homogeneous network and a heterogeneous network. In addition, the embodiments of the present invention impose no limitation on coordinated multipoint transmission, and the coordinated multipoint transmission may be coordinated multipoint transmission between macro base stations, between micro base stations, and between a macro base station and a micro base station. Signals transmitted by any two of a plurality of coordinated transmission points may undergo different large scale fading, and the two coordinated transmission points may belong to a same cell or different cells. This is not limited. A large scale fading characteristic includes one or more of delay spread, Doppler spread, a Doppler frequency shift, an average channel gain, and average latency.

In the embodiments of the present invention, the user equipment (UE) may be a cellular phone, a cordless phone, a Session Initiation Protocol (SIP) phone, a wireless local loop (WLL) station, a personal digital assistant (PDA), a handheld device or computing device having a wireless communication function or another processing device connected to a wireless modem, an in-vehicle device, a wearable device, a terminal device on a future 5G network, or the like. The user equipment in the embodiments of the present invention is any user equipment within coverage of the first network side device.

The following describes key terms mentioned in the embodiments of the present invention.

A MIMO technology is a technology in which a transmit end and a receive end respectively use a plurality of transmit antennas and a plurality of receive antennas to transmit and receive signals, so as to improve communication quality. The MIMO technology includes a diversity technology used for improving transmission reliability and a multiplexing technology used for increasing a data transmission rate.

A CoMP technology is a technology in which a plurality of geographically separated transmission points coordinately transmit data for one terminal (by using a physical downlink shared channel) or jointly receive data sent by one terminal (by using a physical uplink shared channel). In the CoMP technology, a plurality of neighboring cells may jointly perform processing or coordinate edge users to avoid interference and increase an edge user throughput. Downlink CoMP scheduling mainly includes joint transmission (JT), coordinated scheduling and beamforming (CS&CB), and dynamic point selection/dynamic point blanking (DPS/DPB). JT is classified into coherent JT and non-coherent JT.

Coordinated multipoint diversity transmission means that antennas distributed on two or more transmission points use a space frequency block code (SFBC) manner to perform signal transmission. For example, in method 1, each base station has two antennas, each of two base stations separately perform precoding to generate one stream, and the two streams of the two base stations jointly perform two-antenna SFBC. In method 2, each base station has two antennas, and four antennas of two base stations perform four-antenna SFBC+frequency switch transmit diversity (FSTD). When calculating CSI, UE needs to perform channel equivalent processing to calculate a signal to interference plus noise ratio (SINR).

Coordinated multipoint multi-stream transmission means that two or more transmission points independently perform precoding, and transmit different data streams and different code blocks. However, in current CoMP joint transmission, different transmission points transmit same code blocks. Compared with existing CoMP, different manners need to be used for CSI calculation. In other words, when calculating CSI of each stream, interference of another stream needs to be considered.

Interference coordination transmission, namely, coordinated scheduling and beamforming (CSCB) transmission, is transmission in which a base station end performs preprocessing, to avoid causing interference to a user of another cell when sending data to a user of a local cell.

A channel state information-reference signal (CSI-RS) is used by a UE to measure a channel quality indicator (CQI), a precoding matrix indicator (PMI), a rank indicator (RI), and other information in transmission modes 9 and 10. A maximum of 16 CSI-RSs are supported, and are corresponding to 16 different antenna ports whose antenna port numbers are 15 to 30. The UE performs channel estimation by measuring a specified CSI-RS, to obtain CSI, and reports the CSI to a base station by using a physical uplink control channel (PUCCH). The reported CSI includes one or a combination of the CQI, the RI, and the PMI. In some reporting manners, the UE is further required to report a sub-band indicator (sub-band indicator).

To configure the UE to receive and process a specified CSI-RS and provide required feedback information, the base station needs to instruct the UE by configuring higher layer signaling, for example, instruct the UE by configuring radio resource control (RRC) layer signaling.

At present, the UE separately performs measurement based on each piece of CSI process information configured by the base station, and reports corresponding CSI. Different pieces of CSI process information are independent of each other. However, the coordinated multipoint diversity transmission or the coordinated multipoint multi-stream transmission is data transmission jointly implemented by a plurality of coordinated transmission points, and data is correlated to each other (for example, in the coordinated multipoint diversity transmission, combined equivalent processing needs to be performed on channel information of different coordinated transmission points; and in the coordinated multipoint multi-stream transmission, a data stream of one transmission point causes different degrees of interference to a data stream of another transmission point). Existing CSI measurement may be performed for both single-cell transmission and joint transmission of same signals, and the CSI measurement is transparent to UE. In other words, the UE does not know whether it is single-cell transmission or joint transmission, and merely performs measurement and feedback based on each piece of CSI process information. Because different pieces of CSI process information are uncorrelated to each other, a requirement for CSI measurement in the coordinated multipoint diversity transmission or the coordinated multipoint multi-stream transmission cannot be met. As a result, a PMI and a CQI that are reported by the UE are inconsistent with those in actual transmission, further operations of scheduling of a base station side and link adaptation are affected, and performance degrades.

In view of the problem in an existing CSI measurement and feedback mechanism, according to the method for measuring and feeding back channel state information in the embodiments of the present invention, measurement and feedback are performed based on a coordination relationship between a plurality of transmission points. This can improve accuracy of measurement and feedback content, facilitate scheduling of a base station, improve transmission performance, effectively reduce a quantity of CSI processes that need to be configured, and reduce overheads. By applying the embodiments of the present invention, CSI measurement and feedback are no longer transparent to the UE, and the UE can not only clearly know a coordination relationship between network side devices, but also know transmission based on which measurement is performed.

The following describes in detail a method for measuring and feeding back channel state information provided in the embodiments of the present invention with reference to accompanying drawings FIG. 2 to FIG. 5.

Figure 2:
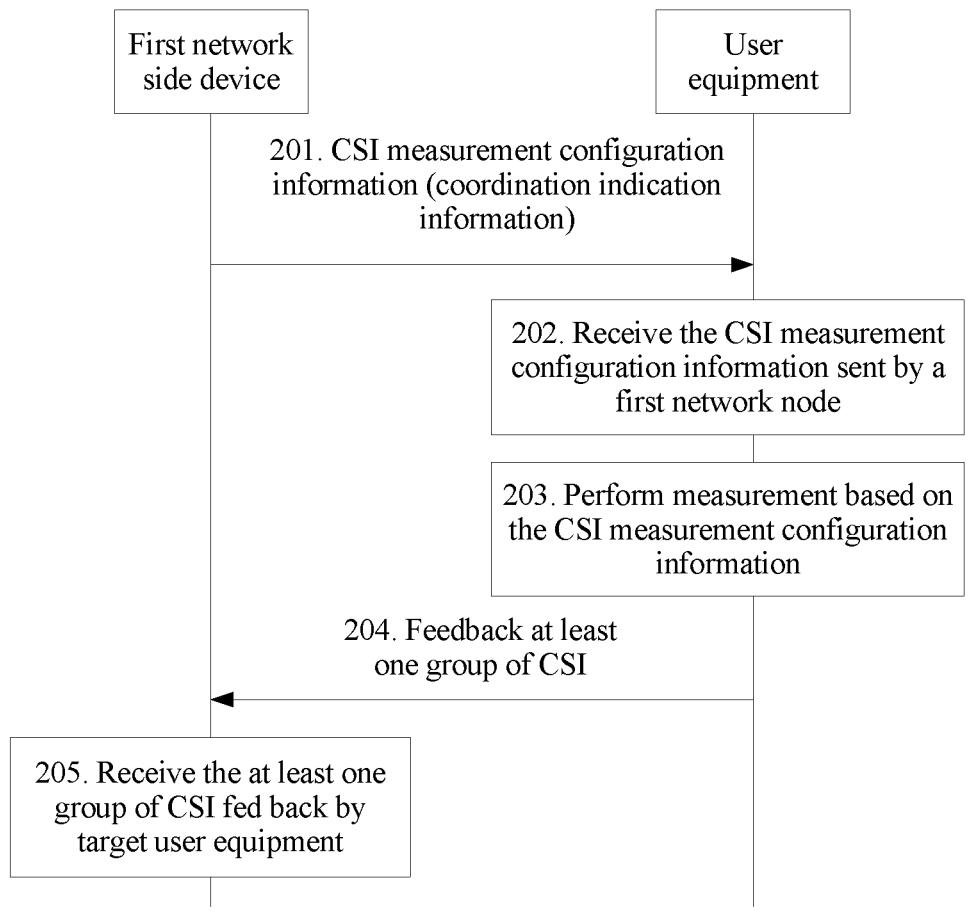
FIG. 2 is a schematic flowchart of a method for measuring and feeding back channel state information according to an embodiment of the present invention.

FIG. 2 is a schematic flowchart of a method for measuring and feeding back channel state information according to an embodiment of the present invention. It should be noted that the embodiment shown in FIG. 2 describes a specific procedure of the method for measuring and feeding back channel state information from perspectives of both a first network side device and a user equipment side. The method may include the following operations.

201. The first network side device sends CSI measurement configuration information to the user equipment, where the CSI measurement configuration information includes coordination indication information.

Specifically, before sending the CSI measurement configuration information to the user equipment UE, the first network side device first determines a coordinating base station of the UE, that is, at least one second network side device, determines that the first network side device and the at least one second network side device are in a coordination relationship, and based on the coordination relationship, configures the CSI measurement configuration information for the UE and sends the CSI measurement configuration information to the UE.

The CSI measurement configuration information includes the coordination indication information. The coordination indication information indicates that the first network side device and the at least one second network side device are in the coordination relationship. The coordination relationship may be an interference relationship or a joint transmission SFBC relationship. The coordination indication information is used to notify the UE that there is the at least one second network side device, and interference exists between the first network side device and the at least one second network side device, or the first network side device and the at least one second network side device jointly transmit different layers of modulation symbols corresponding to a same code word. The coordination indication information is further used to indicate a coordination relationship between the at least one second network side device. In other words, the coordination indication information is used to indicate a coordination relationship between a plurality of network side devices associated with the UE. The first network side device may configure the CSI measurement configuration information in higher layer signaling, for example, configure the CSI measurement configuration information in RRC layer signaling, and send the CSI measurement configuration information to the UE by sending the higher layer signaling by using an air interface. It should be noted that the higher layer signaling further includes other information, in addition to the CSI measurement configuration information. In this embodiment of the present invention, the higher layer signaling being RRC layer signaling is used as an optional way for description.

For example, the first network side device configures the CSI measurement configuration information for the UE by configuring one piece of CSI process information. The CSI process information may be configured in RRC layer signaling. The CSI process information may be CSI process information corresponding to the first network side device or CSI process information corresponding to any one of the at least one second network side device. The former is preferred. The CSI process information is different from CSI process information configured by a base station for UE in the prior art. In the prior art, the base station configures CSI process information for each network side device, and the CSI process information is independent of each other. In this embodiment, the CSI process information may indicate the coordination relationship between the network side devices associated with the UE, and information about another network side device is associated in the CSI process information.

For example, the first network side device configures the CSI measurement configuration information for the UE by configuring at least two pieces of CSI process information. The at least two pieces of CSI process information are CSI process information corresponding to the first network side device and CSI process information corresponding to each of the at least one second network side device. The at least two pieces of CSI process information may be configured in RRC layer signaling. The at least two pieces of CSI process information are different from CSI process information configured by the base station for the UE in the prior art. In the prior art, the base station configures CSI process information for each network side device, and the CSI process information is independent of each other. In this embodiment, one or several pieces of the at least two pieces of CSI process information include information about another network side device, so that the at least two pieces of CSI process information are no longer independent of each other, and the information about the another network side device is associated in the one or several pieces of CSI process information.

Operation 202. The user equipment receives the CSI measurement configuration information sent by the first network side device.

Specifically, the UE receives, by using an air interface, the CSI measurement configuration information sent by the first network side device. If the measurement configuration information is configured in RRC layer signaling, the user equipment receives the RRC layer signaling sent by the first network side device, and obtains the CSI measurement configuration information from the RRC layer signaling.

Operation 203. The user equipment performs measurement based on the CSI measurement configuration information.

Specifically, the UE measures and calculates, based on the coordination relationship between the first network side device and the at least one second network side device that is indicated by the coordination indication information, CSI corresponding to the first network side device and/or CSI corresponding to each of the at least one second network side device. In this embodiment of the present invention, when measuring and calculating the CSI, the UE performs measurement based on the coordination relationship between the first network side device and the at least one second network side device that is indicated by the coordination indication information. In other words, when measuring and calculating CSI of a network side device, the UE needs to consider impact made on transmission of the network side device by another network side device.

For example, the CSI measurement configuration information further includes measurement type indication information. The measurement type indication information is used to instruct the UE to perform measurement based on the coordination indication information and a measurement type indicated by the measurement type indication information. The measurement type is related to a coordinated transmission mode. The coordinated transmission mode includes but is not limited to at least one of coordinated multipoint multi-stream transmission, coordinated multipoint diversity transmission, and interference coordination transmission.

New RRC layer signaling is added to indicate the measurement type indication information, and the measurement type indication information in the RRC layer signaling is configured as follows:

```
eCoMP-Type-r14     CHOICE {
    release                    NULL,
    setup                      CHOICE {
        beam-directed-coordination-r14
    CSI-RS-InfoBDC-r14,
            SFBC-based         coordination-r14
    CSI-RS-InfoSFBC-r14,
            cscb-r14
    CSI-RS-InfoCSCB-r14,
            hybrid-r14         SEQUENCE
    (SIZE (2..8)) OF eCoMPTypeConfig-r14
    }
```

BDC indicates the coordinated multipoint multi-stream transmission, SFBC indicates the coordinated multipoint diversity transmission, and CSCB indicates the interference coordination transmission. Hybrid indicates a hybrid measurement manner, including at least two of the coordinated multipoint multi-stream transmission, the coordinated multipoint diversity transmission, and the interference coordination transmission, for example, a combination of the coordinated multipoint multi-stream transmission and the coordinated multipoint diversity transmission or a combination of the coordinated multipoint diversity transmission and the interference coordination transmission. For different measurement types, the UE performs CSI measurement in different manners. For example, in the coordinated multipoint multi-stream transmission, it is required to assume that a second network side device uses a measured PMI to calculate interference, and in the coordinated multipoint diversity transmission, SFBC equivalent processing needs to be jointly performed on information channels of a plurality of second network side devices and interference information of a network side device other than the first network side device and the at least one second network side device. For the measurement types, the first network side device may configure CSI process information in a same manner. Therefore, the new RRC layer signaling needs to be added to indicate a measurement type based on which the UE performs measurement expected by the first network side device. In one embodiment, corresponding CSI process information is configured in CSI-RS-Info***-r14, and may include CSI-RS resources of a plurality of second network side devices and corresponding interference measurement information.

Operation 204. The UE feeds back at least one group of CSI to the first network side device.

Specifically, after calculating the CSI corresponding to each network side device, the UE feeds back the at least one group of CSI to the first network side device by using an air interface. The CSI includes at least one of a CQI, a PMI, and an RI. The at least one group of CSI may be one, two, three, or four groups of CSI. Alternatively, a group quantity of the at least one group of CSI may be the same as a quantity of network side devices serving the UE, and is determined depending on a specific case.

The CSI measurement configuration information further includes feedback indication information. The UE feeds back the at least one group of CSI to the first network side device according to the feedback indication information. The feedback indication information includes feedback group quantity indication information and feedback content indication information. The feedback group quantity indication information is used to indicate a group quantity of the at least one group of CSI, and the feedback content indication information is used to indicate content of the at least one group of CSI. The feedback indication information and the coordination indication information may be configured in a same RRC layer signaling; or may be configured in different RRC layer signaling, that is, the coordination indication information is configured in one RRC layer signaling and the feedback indication information is configured in another RRC layer signaling. The feedback indication information includes the feedback group quantity indication information and the feedback content indication information. The feedback group quantity indication information is used to indicate the group quantity of the at least one group of CSI, and the feedback content indication information is used to indicate the content of the at least one group of CSI.

For example, the feedback group quantity indication information indicates that there are at least two groups of CSI, and the feedback content indication information indicates that content of the at least two groups of CSI includes CSI corresponding to the first network side device and CSI corresponding to each of the at least one second network side device. The CSI corresponding to the first network side device may include at least one of a PMI, a CQI, and an RI, and the CSI corresponding to the second network side device may include at least one of a PMI, a CQI, and an RI. In an optional way in which there is one second network side device, the UE feeds back two groups of CSI, one group of CSI includes CSI corresponding to the first network side device, and the other group of CSI includes CSI corresponding to the second network side device. In one embodiment, the UE may feed back one group of CSI, and the group of CSI includes CSI corresponding to the first network side device and CSI corresponding to the second network side device. In an optional way in which there are two second network side devices, the UE feeds back three groups of CSI, and each group of CSI is corresponding to one network side device. In one embodiment, the UE may feed back one group of CSI, and the group of CSI includes CSI corresponding to the first network side device and CSI of each second network side device. Alternatively, the UE may feed back two groups of CSI, one group of CSI includes CSI corresponding to the first network side device, and the other group of CSI includes CSI of each second network side device. A case in which there are a plurality of second network side devices is deduced by analogy.

For example, the feedback group quantity indication information indicates that there are at least two groups of CSI, and the feedback content indication information indicates that content of the at least two groups of CSI includes a CSI group corresponding to the first network side device and a CSI group corresponding to each of the at least one second network side device. A CSI group corresponding to a third network side device includes at least one CSI sub-group. The third network side device is any one of the first network side device and at least one second network side device. Each of the at least one CSI sub-group includes at least one of precoding matrix information, rank information, and channel quality information. The precoding matrix information and the rank information are measured based on the third network side device. The channel quality information is measured by using precoding matrix information of a fourth network side device as one of interference sources. The precoding matrix information of the fourth network side device is precoding matrix information measured based on non-zero power CSI-RS resource information corresponding to the fourth network side device. The fourth network side device is any one of other network side devices, other than the third network side device, that are indicated in the coordination indication information. It may be understood that, the UE feeds back at least two groups of CSI. A quantity of the at least two groups of CSI is the same as a sum of a quantity of the first network side device and a quantity of the at least one second network side device. Each group of the at least two groups of CSI includes at least one CSI sub-group. A PMI and an RI in each CSI sub-group are measured based on a corresponding network side device, and a CQI is measured by using a PMI of an interference network side device as one of interference sources. In other words, in all the CSI sub-groups, PMIs and RIs are separately the same but CQIs are different. PMIs of different interference network side devices are corresponding to different CQIs. The interference network side device is any one of other network side devices, other than the foregoing corresponding network side device, that are indicated in the coordination indication information. For example, there is one second network side device TP 1, the first network side device is a TP 0, and the UE feeds back two groups of CSI. One group of CSI includes at least one of a PMI 0, a CQI 0, and an RI 0 that are corresponding to the TP 0. The PMI 0 and the RI 0 are respectively a PMI and an RI that are measured by the UE based on the TP 0. The CQI 0 is a CQI measured and calculated by the UE based on a PMI 1 measured based on the TP 1. In other words, interference caused by the TP 1 to the TP 0 after PMI 1 precoding is performed is considered. The other group of CSI includes at least one of the PMI 1, a CQI 1, and an RI 1 that are corresponding to the TP 1. The PMI 1 and the RI 1 are respectively a PMI and an RI that are measured by the UE based on the TP 1. The CQI 1 is a CQI measured and calculated by the UE based on the PMI 0 measured based on the TP 0. In other words, interference caused by the TP 0 to the TP 1 after PMI 0 precoding is performed is considered. For example, there are two second network side devices TP 1 and TP 2, and the UE may feed back three groups of CSI. A first group of CSI includes a CSI sub-group 1 (at least one of a PMI 0, a CQI 01, and an RI 0) and a CSI sub-group 2 (at least one of the PMI 0, a CQI 02, and the RI 0). The CQI 01 is a CQI measured and calculated by the UE based on a PMI 1 measured based on the TP 1, and the CQI 02 is a CQI measured and calculated by the UE based on a PMI 2 measured based on the TP 2. A second group of CSI includes a CSI sub-group 3 (the PMI 1, a CQI 10, and an RI 1) and a CSI sub-group 4 (the PMI 1, a CQI 12, and the RI 1). The CQI 10 is a CQI measured and calculated by the UE based on the PMI 0 measured based on the TP 0, and the CQI 12 is a CQI measured and calculated by the UE based on the PMI 2 measured based on the TP 2. A third group of CSI includes a CSI sub-group 5 (the PMI 2, a CQI 20, and an RI 2) and a CSI sub-group 6 (the PMI 2, a CQI 21, and the RI 2). The CQI 20 is a CQI measured and calculated by the UE based on the PMI 0 measured based on the TP 0, and the CQI 21 is a CQI measured and calculated by the UE based on the PMI 1 measured based on the TP 1. A case in which there are a plurality of second network side devices is deduced by analogy.

For example, the feedback group quantity indication information indicates that there are at least two groups of CSI, at least one group of CSI, or one group of CSI, and the feedback content indication information indicates that content of the at least one group of CSI includes at least one group of first CSI and/or second CSI that are/is corresponding to the first network side device.

In one embodiment, any group of the at least one group of first CSI includes at least one piece of CSI measured based on at least one interference source of one second network side device. The at least one interference source is generated based on at least one PMI corresponding to the second network side device. The second CSI is CSI measured without regarding each second network side device as an interference source. Compositional elements of the CSI include at least one of a CQI, a PMI, and an RI. A group quantity of the at least one group of first CSI is the same as a quantity of the at least one second network side device. For example, there is one second network side device TP 1, the first network side device is a TP 0, the UE may feed back two groups of CSI, one group of CSI includes first CSI, and the other group of CSI includes second CSI. The second CSI includes at least one of a PMI 0, a CQI 0, and an RI 0 that are measured based on the TP 0. In other words, the second CSI is CSI measured without considering interference caused by the TP 1 to the TP 0. It is assumed that two interference sources are generated based on a PMI 11 and a PMI 12 of the TP 1, the first CSI includes at least one of a PMI 0', a CQI 0', and an RI 0' that are measured based on the PMI 11, and at least one of a PMI 0", a CQI 0", and an RI 0" that are measured based on the PMI 12. The feedback content indication information is further used to instruct the UE to feed back difference information. The difference information may include at least one of a difference between the CQI 0 and the CQI 0', a difference between the PMI 0 and the PMI 0', a difference between the RI 0 and the RI 0', a difference between the CQI 0 and the CQI 0", a difference between the PMI 0 and the PMI 0", a difference between the RI 0 and the RI 0", a difference between the CQI 0" and the CQI 0', a difference between the PMI 0" and the PMI 0', and a difference between the RI 0" and the RI 0'. The UE may feed back one group of CSI, and the group of CSI includes the first CSI or the second CSI. A case in which there are a plurality of second network side devices is deduced by analogy.

In another embodiment, any group of the at least one group of first CSI includes at least one piece of CSI measured based on interference sources of at least two second network side devices. The interference source is generated based on any one of at least one PMI corresponding to each of the at least two second network side devices. For example, there is one second network side device TP 1, the first network side device is a TP 0, the UE may feed back two groups of CSI, one group of CSI includes first CSI, and the other group of CSI includes second CSI. The second CSI includes at least one of a PMI 0, a CQI 0, and an RI 0 that are measured based on the TP 0. In other words, the second CSI is CSI measured without considering interference caused by the TP 1 to the TP 0. The first CSI includes at least one of a PMI 0', a CQI 0', and an RI 0' that are measured based on an interference source generated based on a PMI 1 corresponding to the TP 1. The feedback content indication information is further used to instruct the UE to feed back difference information. The difference information may include at least one of a difference between the CQI 0 and the CQI 0', a difference between the PMI 0 and the PMI 0', and a difference between the RI 0 and the RI 0'. A case in which there are a plurality of second network side devices is deduced by analogy.

For example, the feedback group quantity indication information indicates that there are at least two groups of CSI, and the feedback content indication information indicates that content of the at least two groups of CSI includes at least one group of first CSI and at least one group of second CSI that are corresponding to the first network side device. The at least one group of first CSI is CSI measured by using a specified PMI corresponding to each second network side device as one of interference sources, and the second CSI is CSI measured without using the specified PMI corresponding to each second network side device as one of interference sources. The specified PMI is a PMI measured based on NZP CSI-RS resource information of the corresponding second network side device. The CSI includes at least one of a PMI, a CQI, and an RI. A group quantity of the at least one group of first CSI is the same as a quantity of the at least one second network side device. For example, there is one second network side device TP 1, the first network side device is a TP 0, and the UE feeds back two groups of CSI. One group of CSI includes first CSI, and the first CSI is at least one of a PMI 0, a CQI 0, and an RI 0 that are corresponding to the TP 0 and that are measured by the UE based on a specified PMI measured based on the TP 1. The other group of CSI includes second CSI, and the second CSI is at least one of a PMI 0', a CQI 0', and an RI 0' that are corresponding to the TP 0 and that are measured by the UE not based on the specified PMI measured based on the TP 1. The specified PMI is a PMI measured by the UE based on NZP CSI-RS resource information of the TP 1. The feedback content indication information is further used to instruct the UE to feed back difference information. The difference information may include at least one of a difference between the CQI 0 and the CQI 0', a difference between the PMI 0 and the PMI 0', and a difference between the RI 0 and the RI 0'. A case in which there are a plurality of second network side devices is deduced by analogy.

For example, the feedback group quantity indication information indicates that there are at least two groups of CSI, and the feedback content indication information indicates that content of each group of the at least two groups of CSI includes a PMI and an equivalent CQI. Alternatively, the feedback group quantity indication information indicates that there is one group of CSI, and the feedback content indication information indicates that content of the group of CSI includes an equivalent CQI and at least two PMIs. The equivalent CQI is a CQI obtained by the user equipment by performing equivalent processing based on a transmit-diversity related transmission mode. The PMI included in each group of the at least two groups of CSI is measured based on a corresponding network side device, and each of the at least two PMIs is measured based on a corresponding network side device.

For example, when the feedback group quantity indication information indicates that there are at least two groups of CSI, content of the at least one group of CSI that is indicated by the feedback content indication information further includes difference information. The difference information includes any group of CSI of the at least two groups of CSI and difference information between the any group of CSI and another group of CSI other than the any group of CSI in the at least two groups of CSI.

For example, the feedback indication information includes order indication information, used to indicate a feedback order of the at least one group of CSI. The feedback order of the at least one group of CSI may be an order of distances between network side devices and the UE, an identity order of the network side devices, or the like.

Operation 205. The first network side device receives the at least one group of CSI fed back by the UE.

Specifically, the first network side device receives, by using an air interface, the at least one group of CSI fed back by the UE. The first network side device may efficiently perform CoMP transmission scheduling based on content of the at least one group of CSI, and determine an appropriate modulation and coding scheme (Modulation and Coding Scheme, MCS) more accurately. This improves system transmission performance.

According to this embodiment of the present invention, the first network side device sends the channel state information CSI measurement configuration information to the user equipment, where the CSI measurement configuration information includes the coordination indication information indicating that the first network side device and the at least one second network side device are in the coordination relationship; the user equipment receives the CSI measurement configuration information sent by the first network side device, performs measurement based on the CSI measurement configuration information, and feeds bask the at least one group of CSI to the first network side device based on the CSI measurement configuration information; and the first network side device receives the at least one group of CSI fed back by the user equipment based on the CSI measurement configuration information, to perform measurement based on a coordination relationship between a plurality of network side devices. This can improve accuracy of fed back content and further facilitate scheduling of a base station.

Figure 3:
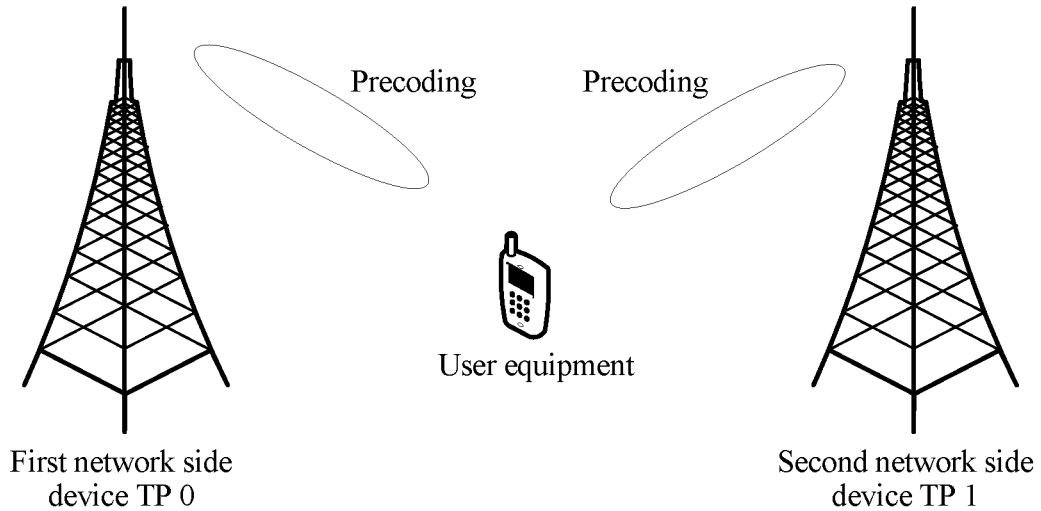
FIG. 3 is a schematic scenario diagram of coordinated multipoint multi-stream transmission according to an embodiment of the present invention.

FIG. 3 is a schematic scenario diagram of coordinated multipoint multi-stream transmission according to an embodiment of the present invention. The following describes in detail a method for measuring and feeding back channel state information provided in an embodiment of the present invention based on the coordinated multipoint multi-stream transmission.

In FIG. 3, that two network side devices perform coordinated multipoint multi-stream transmission is used as an optional way. After independently performing precoding, the two network side devices coordinately transmit a plurality of data streams to UE, thereby increasing a data transmission rate. In this scenario, CSI measurement configuration information is configured as follows: It is assumed that a measurement set is 2, that is, two network side devices: a TP 0 and a TP 1, jointly perform measurement; and it is assumed that the TP 0 is the first network side device, namely, a serving base station of the UE, and the TP 1 is the second network side device, namely, a coordinating base station of the UE.

According to a first aspect, the first network side device configures the CSI measurement configuration information by configuring one piece of CSI process information for the UE. The CSI process information may be used to indicate the coordination indication information. The CSI process information is CSI process information corresponding to the first network side device. The CSI process information includes non-zero power (NZP) CSI-RS resource information of each of the at least one second network side device. The CSI process information is configured in RRC layer signaling.

In a first possible implementation of the first aspect, the CSI process information is the CSI process information corresponding to the first network side device. The CSI process information includes the non-zero power NZP CSI-RS resource information of the first network side device. In addition, the CSI process information includes NZP CSI-RS resource information of each of the at least one second network side device. The CSI process information is specifically as follows:

```
                CSI-Process information elements
                -- ASN1START
                CSI-Process-r11 ::=        SEQUENCE {
                    csi-ProcessId-r11          CSI-ProcessId-r11,
                    csi-RS-ConfigNZPId0-r11        CSI-RS-ConfigNZPId-r11, // a
default index is 0 for the serving base station, and two NZP CSI-RSs are
corresponding to TP 0 and TP 1, respectively,
                    csi-RS-ConfigNZPId1-r11        CSI-RS-ConfigNZPId-r11,
                    csi-IM-ConfigId-r11            CSI-IM-ConfigId-r11,
                    p-C-AndCBSRList-r11    SEQUENCE    (SIZE    (1..2)) OF
P-C-AndCBSR-r11,
                    cqi-ReportBothProc-r11         CQI-ReportBothProc-r11
        OPTIONAL,  -- Need OR
                    cqi-ReportPeriodicProcId-r11   INTEGER (0..maxCQI-ProcExt-r11)
        OPTIONAL,  -- Need OR
                    cqi-ReportAperiodicProc-r11    CQI-ReportAperiodicProc-r11
        OPTIONAL,  --Need OR
                    ...,
                    [[    alternativeCodebookEnabledFor4TXProc-r12  ENUMERATED
{true} OPTIONAL,-- Need ON
                    csi-IM-ConfigIdList-r12    CHOICE {
                        release                    NULL,
                        setup                      SEQUENCE (SIZE (1..2)) OF
CSI-IM-ConfigId-r12
                    }
        OPTIONAL,-- Need ON
                    cqi-ReportAperiodicProc2-r12   CHOICE {
                        release                    NULL,
                        setup                      CQI-ReportAperiodicProc-r11
                    }
        OPTIONAL -- Need ON
                    ]],
                    [[    cqi-ReportAperiodicProc-r13   CQI-ReportAperiodicProc-r13
            OPTIONAL,  -- Need ON
                    cqi-ReportAperiodicProc2-r13       CHOICE {
                        release                    NULL,
                        setup                      CQI-ReportAperiodicProc-r13
                    }
```

```
                    OPTIONAL,  -- Need ON
                            eMIMO-Type-r13              CHOICE {
                                release                 NULL,
                                setup                   CHOICE {
                                    nonPrecoded-r13
CSI-RS-InfoNonPrecoded-r13,
                                    beamformed-r13
CSI-RS-InfoBeamformed-r13
                                }
                            }
            OPTIONAL -- Need ON
                ]]
            }
            P-C-AndCBSR-r11 ::= SEQUENCE {
                p-C-r11                         INTEGER (-8..15),
                codebookSubsetRestriction-r11   BIT STRING
            }
            P-C-AndCBSR-r13 ::= SEQUENCE {
                legacySet                       SEQUENCE {
                    p-C-r11                     INTEGER (-8..15),
                    codebookSubsetRestriction1-r13  BIT STRING
                }                                           OPTIONAL,-- Cond
BeamformedKna
                codebookSubsetRestriction2-r13   BIT STRING   OPTIONAL,--
Cond NonPreCoded
                codebookSubsetRestriction3-r13   BIT STRING   OPTIONAL --
Cond BeamformedK1a
            }
            P-C-AndCBSR-PerResourceConfig-r13 ::=        SEQUENCE  (SIZE (1..2))
OF P-C-AndCBSR-r13
            -- ASN1STOP
```

The bold part csi-RS-ConfigNZPId-r11 indicates to configure NZP CSI-RS resource information of the first network side device and the second network side device. Therefore, the CSI process information includes not only the NZP CSI-RS resource information of the first network side device but also the NZP CSI-RS resource information of the second network side device. csi-RS-ConfigNZPId indicates that a CSI-RS is transmitted by using non-zero power. A transmission frequency of the CSI-RS is the same as a transmission frequency of the CSI process information. The NZP CSI-RS resource information is used to indicate a time-frequency resource used when the CSI-RS is transmitted by using the non-zero power. Information in each group of csi-RS-ConfigNZPId-r11 may be independently configured based on each network side device. For specific included information, refer to the following description:

```
                        CSI-RS-ConfigNZP information elements
                        -- ASN1START
                        CSI-RS-ConfigNZP-r11 ::=         SEQUENCE {
                            csi-RS-ConfigNZPId-r11       CSI-RS-ConfigNZPId-r11,
                            antennaPortsCount-r11        ENUMERATED  {an1,  an2,  an4,
an8},
                            resourceConfig-r11           INTEGER (0..31),
                            subframeConfig-r11           INTEGER (0..154),
                            scramblingIdentity-r11       INTEGER (0..503),
                            qcl-CRS-Info-r11             SEQUENCE {
                                qcl-ScramblingIdentity-r11      INTEGER (0..503),
                                crs-PortsCount-r11              ENUMERATED  {n1,  n2,  n4,
spare1},
                                mbsfn-SubframeConfigList-r11    CHOICE {
                                    release                         NULL,
                                    setup                           SEQUENCE {
                                        subframeConfigList
MBSFN-SubframeConfigList
                                    }
                                }
                                OPTIONAL -- Need ON
                            }
                            OPTIONAL,-- Need OR
                            ...,
                            [[ eMIMO-Info-r13            CHOICE {
                                release                  NULL,
                                setup                    SEQUENCE {
                                    nzp-resourceConfigList-r13           SEQUENCE  (SIZE
(2..8)) OF ResourceConfig-r13,
                                    cdmType                              ENUMERATED
{cdm2, cdm4} OPTIONAL -- Need OR
                                }
                            }
```

```
            OPTIONAL -- Need ON
                ]]
            }
        }
        ResourceConfig-r13 ::=                    INTEGER (0..31)
    -- ASN1STOP
```

The NZP CSI-RS resource information of the second network side device configured in the CSI process information is used to indicate the coordination indication information. In other words, when one piece of CSI process information includes a plurality of pieces of different NZP CSI-RS resource configuration information, it indicates that the plurality of pieces of different NZP CSI-RS resource configuration information are correlated to each other. In the coordinated multipoint multi-stream transmission, the coordination indication information is also interference indication information. The first network side device sends the RRC layer signaling to the UE. The UE obtains the coordination indication information from the RRC layer signaling, learns, based on the coordination indication information, that the CSI process information includes a plurality of groups of different NZP CSI-RS resource information, and performs measurement based on interference between network side devices. In other words, when the UE calculates a CQI of a network side device, it is assumed that an interference network side device causes interference to transmission of the network side device by using a specified beam. The specified beam is a beam generated by the UE based on a PMI selected by measuring channel information of the interference network side device.

NZP CSI-RS type indication information is added to indicate different types of NZP CSI-RSs. In other words, different network side devices may be corresponding to different forms of NZP CSI-RSs. For example, an NZP CSI-RS corresponding to the first network side device TP 0 is a non-precoded type, and an NZP CSI-RS corresponding to the second network side device TP 1 is a beamformed type, namely, a precoded type. The NZP CSI-RS type indication information needs to be indicated to the UE by using higher layer signaling. In one embodiment, the NZP CSI-RS type indication information may be indicated in configuration of the NZP CSI-RS resource information corresponding to each TP. An optional way of specific configuration is as follows:

```
        CSI-RS-ConfigNZP information elements
        -- ASN1START
        CSI-RS-ConfigNZP-r11 ::=      SEQUENCE {
            csi-RS-ConfigNZPId-r11         CSI-RS-ConfigNZPId-r11,
            antennaPortsCount-r11          ENUMERATED  {an1,  an2,  an4,
an8},
            resourceConfig-r11             INTEGER (0..31),
            subframeConfig-r11             INTEGER (0..154),
            scramblingIdentity-r11         INTEGER (0..503),
            qcl-CRS-Info-r11               SEQUENCE {
                qcl-ScramblingIdentity-r11         INTEGER (0..503),
                crs-PortsCount-r11                 ENUMERATED  {n1,  n2,  n4,
spare1},
                mbsfn-SubframeConfigList-r11       CHOICE {
                    release                            NULL,
                    setup                              SEQUENCE {
                        subframeConfigList
        MBSFN-SubframeConfigList
                    }
                }
        OPTIONAL -- Need ON
                }
        OPTIONAL,-- Need OR
            ...,
            [[ eMIMO-Info-r13                  CHOICE {
                release                            NULL,
                setup                              SEQUENCE {
                    nzp-resourceConfigList-r13         SEQUENCE       (SIZE
(2..8)) OF ResourceConfig-r13,
                    cdmType                            ENUMERATED
{cdm2, cdm4} OPTIONAL -- Need OR
                    eMIMO-Type-r13             CHOICE {
                        release                    NULL,
                        setup                      CHOICE {
                            nonPrecoded-r13
        CSI-RS-InfoNonPrecoded-r13,
                            beamformed-r13
        CSI-RS-InfoBeamformed-r13
                        }                                      OPTIONAL --   Need
ON
                }
            }
```

```
        OPTIONAL -- Need ON
            ]]
        }
    }
    ResourceConfig-r13 ::=                  INTEGER (0..31)
    -- ASN1STOP
```

The bold part is the NZP CSI-RS type indication information added to configuration information of the NZP CSI-RS resource information.

When the NZP CSI-RS type indication information in the NZP CSI-RS resource information of the first network side device or the second network side device is a beamformed type, namely, a precoded type, a plurality of NZP CSI-RS resource information identifiers may be configured. An NZP CSI-RS resource corresponding to an NZP CSI-RS resource information identifier is used to perform at least one of channel measurement and interference measurement. When the UE performs at least one of channel measurement and interference measurement of the first network side device or the network side device, the UE first selects NZP CSI-RS resource indication (CRI) information corresponding to the network side device, obtains an RI and a PMI of the network side device based on a channel measured based on an NZP CSI-RS resource corresponding to the CRI, and uses a signal obtained by performing PMI processing on the channel corresponding to the CRI as a channel signal or an interference signal to perform CQI calculation.

New RRC layer signaling is added. The RRC layer signaling is used to indicate feedback indication information. The feedback indication information is used to instruct the UE to feed back one group of CSI specific to each group of configured NZP CSI-RS resource information. The group of CSI includes at least one of an RI, a PMI, and a CQI. The feedback indication information includes order indication information and/or element indication information. The order indication information is used to indicate a feedback order of a plurality of groups of CSI. The element indication information is used to indicate that the CSI includes which one or which combination of the RI, the PMI, and the CQI, and may indicate that content included in all the groups of CSI is the same or different.

In one embodiment, the feedback indication information is used to instruct the UE to feed back a plurality of groups of CSI according to an order of the configured NZP CSI-RS resource information, that is, feed back the plurality of groups of CSI according to an order of index values (csi-RS-ConfigNZPId) of the NZP CSI-RS resource information. In this case, each group of CSI includes same content, that is, forms of combinations of the RI, the PMI, and the CQI in all the groups of CSI are the same. In other words, csi-RS-ConfigNZPId0 is corresponding to the TP 0 and CSI 0, csi-RS-ConfigNZPId1 is corresponding to the TP 1 and CSI 1, and an order of the plurality of groups of CSI fed back by UE is CSI 0 and CSI 1. It may be understood that such an implementation is a fixed feedback manner.

In one embodiment, the feedback indication information is indicated for each network side device. The first network side device configures indication information in the feedback indication information for each network side device. Each group of CSI includes at least one of an RI, a PMI, and a CQI. Content included in each group of CSI is independently configured. In this case, a feedback order of a plurality of groups of CSI is not limited. It may be understood that such an implementation is a dynamic feedback manner. For example, the following information is added to CQI-ReportConfig information elements:

```
CQI-ReportBothProc-r14 ::=        SEQUENCE {
    cqi-ReportBothProcId-r14      CQI-ReportBothProcId-r14,
    ri-Report                     BOOLEAN
    pmi-Report                    BOOLEAN
}
CQI-ReportBothProcId information elements
-- ASN1START
CQI-ReportBothProcId-r14 ::=      INTEGER
(1..maxCQI-ReportBothProcId-r14)
-- ASN1STOP
CQI-ReportConfig-r14 ::= CHOICE {
    release                       NULL,
    setup                         SEQUENCE {
        cqi-ReportListBothProc-r14    SEQUENCE (SIZE(2..8))
OF CQI-ReportBothProc-r14,
    }
    CQI-ReportBothProcId and CSI-RS-ConfigNZPId are in a one-to-one
correspondence.
```

In one embodiment of the first aspect, the NZP CSI-RS resource information of each second network side device includes CSI-RS pattern information. The CSI-RS pattern information is used to indicate a location of a resource block (RE) occupied for transmitting a CSI-RS. An RE is a smallest time-frequency resource unit. In other words, the CSI-RS pattern information indicates a time-frequency resource occupied for transmitting the CSI-RS. In the prior art, for CSI measurement in single-cell transmission, a plurality of pieces of NZP CSI-RS resource information may be configured to correspond to different pattern information for measurement. All the different pattern information is based on one network side device. However, in this embodiment of the present invention, different pattern information belongs to different network side devices. To make the UE know whether measurement is performed based on a coordination transmission scenario or based on single-cell transmission scenario, enhanced signaling is introduced to NZP CSI-RS resource information indication signaling in the CSI process, to notify the UE that which CSI-RS pattern information is measured based on the coordination transmission scenario. The enhanced signaling in the NZP CSI-RS resource information indication signaling in the CSI process information includes CSI-RS pattern information of each second network side device and CSI-RS pattern information of the first network side device. The CSI-RS pattern information of each second network side device included in the enhanced signaling is used to indicate the coordination indication information. In other words, a plurality of pieces of CSI-RS pattern information included in the enhanced signaling indicate, to the UE, network side devices that are associated with each other during measurement, and indirectly indicate network side devices that interfere with each other during measurement. The NZP CSI-RS resource information indication signaling in the CSI process information is as follows:

```
CSI-RS-ConfigNZP information elements
-- ASN1START
CSI-RS-ConfigNZP-r11 ::=              SEQUENCE {
    csi-RS-ConfigNZPId-r11                CSI-RS-ConfigNZPId-r11,
    antennaPortsCount-r11                 ENUMERATED {an1, an2, an4, an8},
    resourceConfig-r11                    INTEGER (0..31),
    subframeConfig-r11                    INTEGER (0..154),
    scramblingIdentity-r11                INTEGER (0..503),
    qcl-CRS-Info-r11                      SEQUENCE {
        qcl-ScramblingIdentity-r11            INTEGER (0..503),
        crs-PortsCount-r11                    ENUMERATED {n1, n2, n4,
spare1},
        mbsfn-SubframeConfigList-r11          CHOICE {
            release                               NULL,
            setup                                 SEQUENCE {
                       subframeConfigList
MBSFN-SubframeConfigList
            }
        } OPTIONAL -- Need ON
    } OPTIONAL,-- Need OR
    ...,
    [[ eMIMO-Info-r13                     CHOICE {
            release                               NULL,
            setup                                 SEQUENCE {
                nzp-resourceConfigList-r13            SEQUENCE   (SIZE
(2..8)) OF ResourceConfig-r13,
                cdmType                               ENUMERATED
{cdm2, cdm4}         OPTIONAL -- Need OR
            }
        } OPTIONAL -- Need ON
    ]]
    [[eCoMP-Info-r14                      CHOICE {
            release                               NULL,
            setup                                 SEQUENCE {
                correlated-nzp-resourceConfigList-r13     SEQUENCE
(SIZE (2..8)) OF ResourceConfig-r13,
                cdmType                               ENUMERATED
{cdm2, cdm4} OPTIONAL-- Need OR
            }
        } OPTIONAL -- Need ON
    ]]
}
ResourceConfig-r13 ::=                INTEGER (0..31)
-- ASN1STOP
```

The bold part in the NZP CSI-RS resource information indication signaling is the enhanced signaling. In the possible implementation, the first network side device configures same NZP CSI-RS resource information and different CSI-RS pattern information for each second network side device, that is, time-frequency resource locations on which the CSI-RS pattern information of all the second network side devices are different. Therefore, a premise of the possible implementation is that the CSI process information of each second network side device includes the foregoing information in italic type. It should be noted that the bold part is merely an optional way, and does not constitute a limitation to this embodiment of the present invention. The name of enhanced signaling is also an optional way, and is determined depending on a specific case.

When the NZP CSI-RS type indication information in the NZP CSI-RS resource information of the first network side device or the second network side device is a beamformed type, namely, a precoded type, a plurality of NZP CSI-RS resource information identifiers may be configured. An NZP CSI-RS resource corresponding to an NZP CSI-RS resource information identifier is used to perform at least one of channel measurement and interference measurement. When the UE performs at least one of channel measurement and interference measurement of the first network side device or the network side device, the UE first selects CRI corresponding to the network side device, obtains an RI and a PMI of the network side device based on a channel measured based on an NZP CSI-RS resource corresponding to the CRI, and uses a signal obtained by performing PMI processing on the NZP CSI-RS resource measurement channel corresponding to the CRI as a channel signal or interference signal to perform CQI calculation.

For feedback indication information in the possible implementation, refer to description of the feedback indication information in the first possible implementation of the first aspect, and details are not described herein again.

In one embodiment of the first aspect, interference measurement resource information indication signaling in the CSI process information includes the NZP CSI-RS resource information of each second network side device. The NZP CSI-RS resource information of each second network side device is used to indicate the coordination indication information. Interference measurement (IM) resource information indication signaling in existing CSI process information includes only zero power (ZP) CSI-RS resource information of a corresponding network side device. The ZP CSI-RS resource information is used to indicate a time-frequency resource used for transmitting a CSI-RS by using zero power. The ZP CSI-RS resource information is used for interference measurement. In the possible implementation, the IM resource information indication signaling in the CSI process information includes ZP CSI-RS resource information of the first network side device and NZP CSI-RS resource information of each second network side device. The IM resource information indication signaling is used to indicate the coordination indication information. The possible implementation is implemented by extending existing CSI-IM-Config information elements, and the following information is added to existing CSI-IM-Config information elements:

```
CSI-IM-Config-r14 ::= SEQUENCE {
    csi-IM-ConfigId-r14      CSI-IM-ConfigId-r14,
    nzp-resourceConfigList-r14    SEQUENCE (SIZE (2..8)) OF
ResourceConfig-r14,
    zp-resourceConfig-r14    INTEGER (0..31),
    subframeConfig-r14                   INTEGER (0..154),
    ...
}
```

The IM resource information indication signaling includes the NZP CSI-RS resource information of the second network side device and the ZP CSI-RS resource information of the first network side device, and is used to instruct the UE to perform measurement based on two interference types during interference measurement. One type is interference information obtained based on the ZP CSI-RS resource information, and the interference information includes both a network side device outside a measurement set and some network side devices (network side devices that do not use non-zero power to transmit a CSI-RS) included in the measurement set. The other type is interference information obtained based on the NZP CSI-RS resource information. The UE first obtains an RI and a PMI that are of the second network side device based on a channel measured based an NZP CSI-RS resource information, and then uses, as one of interference sources, a signal obtained after the second network side device uses the PMI, to perform CQI calculation.

The IM resource information indication signaling or the CSI process information further includes NZP CSI-RS type indication information, reference may be made to description of the NZP CSI-RS type indication information in the first possible implementation of the first aspect, and details are not described herein again.

When the IM resource information indication signaling instructs to perform interference measurement based on the NZP CSI-RS resource information of the second network side device, if the NZP CSI-RS type indication information of the second network side device is a beamformed type, namely, a precoded type, a plurality of NZP CSI-RS resource information identifiers may be configured. An NZP CSI-RS resource corresponding to an NZP CSI-RS resource information identifier is used for interference measurement. However, when measuring interference, the UE first selects NZP CRI, obtains an RI and a PMI that are of the second network side device based on a channel measured based on an NZP CSI-RS resource corresponding to the CRI, and uses a signal formed after PMI processing is performed on the measured channel corresponding to the CRI as one of interference sources to perform CQI calculation.

New RRC layer signaling is added. The RRC layer signaling is used to indicate feedback indication information. The feedback indication information includes feedback group quantity indication information and feedback content indication information. The feedback group quantity indication information indicates that there are at least two groups of CSI, and the feedback content indication information indicates that content of the at least two groups of CSI includes a CSI group corresponding to the first network side device and a CSI group corresponding to each of the at least one second network side device. A CSI group corresponding to a third network side device includes at least one CSI sub-group. The third network side device is any one of the first network side device and at least one second network side device. Each of the at least one CSI sub-group includes at least one of precoding matrix information, rank information, and channel quality information. The precoding matrix information and the rank information are measured based on the third network side device. The channel quality information is measured by using precoding matrix information of a fourth network side device as one of interference sources. The precoding matrix information of the fourth network side device is precoding matrix information measured based on non-zero power CSI-RS resource information corresponding to the fourth network side device. The fourth network side device is any one of other network side devices, other than the third network side device, that are indicated in the coordination indication information. It may be understood that, the UE feeds back at least two groups of CSI. A quantity of the at least two groups of CSI is the same as a sum of a quantity of the first network side device and a quantity of the at least one second network side device. Each group of the at least two groups of CSI includes at least one CSI sub-group. A PMI and an RI in each CSI sub-group are measured based on a corresponding network side device, and a CQI is measured by using a PMI of an interference network side device as one of interference sources. In other words, in all the CSI sub-groups, PMIs and RIs are separately the same but CQIs are different. PMIs of different interference network side devices are corresponding to different CQIs. The interference network side device is any one of other network side devices, other than the foregoing corresponding network side device, that are indicated in the coordination indication information.

For example, there is one second network side device TP 1, the first network side device is a TP 0, and the UE feeds back two groups of CSI. One group of CSI includes at least one of a PMI 0, a CQI 0, and an RI 0 that are corresponding to the TP 0. The PMI 0 and the RI 0 are respectively a PMI and an RI that are measured by the UE based on the TP 0. The CQI 0 is a CQI measured and calculated by the UE based on a PMI 1 measured based on the TP 1. In other words, interference caused by the TP 1 to the TP 0 after PMI 1 precoding is performed is considered. The other group of CSI includes at least one of the PMI 1, a CQI 1, and an RI 1 that are corresponding to the TP 1. The PMI 1 and the RI 1 are respectively a PMI and an RI that are measured by the UE based on the TP 1. The CQI 1 is a CQI measured and calculated by the UE based on the PMI 0 measured based on the TP 0. In other words, interference caused by the TP 0 to the TP 1 after PMI 0 precoding is performed is considered.

For example, there are two second network side devices TP 1 and TP 2, and the UE may feed back three groups of CSI. A first group of CSI includes a CSI sub-group 1 (at least one of a PMI 0, a CQI 01, and an RI 0) and a CSI sub-group 2 (at least one of the PMI 0, a CQI 02, and the RI 0). The CQI 01 is a CQI measured and calculated by the UE based on a PMI 1 measured based on the TP 1, and the CQI 02 is a CQI measured and calculated by the UE based on a PMI 2 measured based on the TP 2. A second group of CSI includes a CSI sub-group 3 (the PMI 1, a CQI 10, and an RI 1) and a CSI sub-group 4 (the PMI 1, a CQI 12, and the RI 1). The CQI 10 is a CQI measured and calculated by the UE based on the PMI 0 measured based on the TP 0, and the CQI 12 is a CQI measured and calculated by the UE based on the PMI 2 measured based on the TP 2. A third group of CSI includes a CSI sub-group 5 (the PMI 2, a CQI 20, and an RI 2) and a CSI sub-group 6 (the PMI 2, a CQI 21, and the RI 2). The CQI 20 is a CQI measured and calculated by the UE based on the PMI 0 measured based on the TP 0, and the CQI 21 is a CQI measured and calculated by the UE based on the PMI 1 measured based on the TP 1. A case in which there are a plurality of second network side devices is deduced by analogy.

For a plurality of network side devices, the first network side device may separately configure the feedback indication information for each network side device. In other words, CQI-ReportBothProcId and CSI-RS-ConfigNZPId configured in CSI-IM are in a one-to-one correspondence. In one embodiment, for content that does not need to be fed back, the feedback indication information is used to instruct the UE to feed back 0. For example, an RI and a CQI do not need to be fed back, and (0, PMI, 0) is fed back. For the possible implementation, reference may also be made to the feedback content indication information in the first possible implementation of the first aspect.

In one embodiment, when the NZP CSI-RS type indication information in the NZP CSI-RS resource information of the first network side device or the second network side device is a beamformed type, namely, a precoded type, corresponding NZP CRI may be fed back during CSI feedback. Reference may be made to CRI selection and reporting procedures in the prior art, and details are not described herein.

According to a second aspect, the first network side device configures the CSI measurement configuration information for the UE by configuring at least two pieces of CSI process information. At least one of the at least two pieces of CSI process information includes process identifiers of the at least two pieces of CSI process information, used to indicate the coordination indication information. To be specific, when the at least one piece of CSI process information includes a process identifier of CSI process information other than CSI process information including the coordination indication information in the at least two pieces of CSI process information, it indicates that network side devices interfere with each other. The at least one of the at least two pieces of CSI process information includes the process identifier of the CSI process information other than the CSI process information including the coordination indication information in the at least two pieces of CSI process information. It may be understood that each of the at least two pieces of CSI process information includes the process identifier of the CSI process information other than the CSI process information including the coordination indication information in the at least two pieces of CSI process information, or several pieces of the at least two pieces of CSI process information include the process identifier of the CSI process information other than the CSI process information including the coordination indication information in the at least two pieces of CSI process information. The at least two pieces of CSI process information are CSI process information corresponding to the first network side device and CSI process information corresponding to each of the at least one second network side device. Before sending the CSI measurement information, the first network side device configures CSI process information for each network side device associated with the UE. Different from CSI process information configured by the first network side device for each network side device in the prior art, the CSI process information herein is further associated with information about another network side device in addition to corresponding to the network side device. Specifically, for example, each of the at least two pieces of CSI process information includes the process identifier of the CSI process information other than the CSI process information including the coordination indication information in the at least two pieces of CSI process information. Interference measurement resource indication signaling is added to each piece of CSI process information, and reference may be made to the following CSI process information:

```
CSI-Process information elements
-- ASN1START
CSI-Process-r11 ::=                           SEQUENCE {
    csi-ProcessId-r11                             CSI-ProcessId-r11,
    csi-RS-ConfigNZPId-r11                        CSI-RS-ConfigNZPId-r11,
    csi-IM-ConfigId-r11                           CSI-IM-ConfigId-r11,
    p-C-AndCBSRList-r11                           SEQUENCE       (SIZE     (1..2))    OF
P-C-AndCBSR-r11,
    cqi-ReportBothProc-r11                        CQI-ReportBothProc-r11
            OPTIONAL, -- Need OR
    cqi-ReportPeriodicProcId-r11                  INTEGER (0..maxCQI-ProcExt-r11)
            OPTIONAL, -- Need OR
    cqi-ReportAperiodicProc-r11                   CQI-ReportAperiodicProc-r11
            OPTIONAL, -- Need OR
    ...,
    [[ alternativeCodebookEnabledFor4TXProc-r12           ENUMERATED
{true} OPTIONAL,-- Need ON
            csi-IM-ConfigIdList-r12               CHOICE {
                release                               NULL,
                setup                                 SEQUENCE (SIZE (1..2)) OF
CSI-IM-ConfigId-r12
            }
            OPTIONAL,-- Need ON
                        CSI-IM-ConfigIdList-r14 ::=           CHOICE {
                            release           NULL,
                            setup             SEQUENCE(SIZE(1..4))                   OF
            CSI-Process-ConfigId-r11      OPTIONAL, -- Need ON
}
            cqi-ReportAperiodicProc2-r12          CHOICE {
                release                               NULL,
                setup                                 CQI-ReportAperiodicProc-r11
```

```
                                            }                     OPTIONAL -- Need ON
        ]],
        [[ cqi-ReportAperiodicProc-r13              CQI-ReportAperiodicProc-r13
    OPTIONAL,  -- Need ON
            cqi-ReportAperiodicProc2-r13           CHOICE {
                release                                NULL,
                setup                                  CQI-ReportAperiodicProc-r13
            }
    OPTIONAL, -- Need ON
            eMIMO-Type-r13                         CHOICE {
                release                                NULL,
                setup                                  CHOICE {
                            nonPrecoded-r13
CSI-RS-InfoNonPrecoded-r13,
                            beamformed-r13
CSI-RS-InfoBeamformed-r13
                                }
                                }
    OPTIONAL -- Need ON
        ]]
    }
    P-C-AndCBSR-r11 ::= SEQUENCE {
        p-C-r11                                    INTEGER (-8..15),
        codebookSubsetRestriction-r11              BIT STRING
    }
    P-C-AndCBSR-r13 ::= SEQUENCE {
        legacySet                                  SEQUENCE {
            p-C-r11                                    INTEGER (-8..15),
            codebookSubsetRestriction1-r13             BIT STRING
        }                                              OPTIONAL,-- Cond
BeamformedKna
        codebookSubsetRestriction2-r13             BIT STRING        OPTIONAL,--
Cond NonPreCoded
        codebookSubsetRestriction3-r13             BIT STRING        OPTIONAL --
Cond BeamformedK1a
    }
    P-C-AndCBSR-PerResourceConfig-r13 ::= SEQUENCE (SIZE (1..2))
OF P-C-AndCBSR-r13
        -- ASN1STOP
```

The bold part is the interference measurement resource indication signaling, including the process identifier (CSI-Process-ConfigId) of the CSI process information other than the CSI process information including the coordination indication information in the at least two pieces of CSI process information. The interference measurement resource indication signaling is used to notify the UE that which pieces of CSI process information need to be jointly considered when measurement calculation is performed. To be specific, in addition to interference measured based on ZP CSI-RS resource information in the interference measurement resource indication signaling configured in the CSI process information, CSI corresponding to each piece of CSI process information other than the CSI process information including the coordination indication information further needs to be calculated based on the process identifier of the CSI process information other than the CSI process information including the coordination indication information in the at least two pieces of CSI process information. The CSI corresponding to each piece of CSI process information is used in interference calculation. In other words, it is assumed that at least one network side device uses the measured CSI to obtain interference caused to the UE. The interference measurement resource indication signaling including the ZP CSI-RS resource information may be configured only in the CSI process information corresponding to the first network side device, and only CSI process information corresponding to another network side device may be configured in the CSI-RS resource information.

In one embodiment, the IM resource information indication signaling in each piece of the at least two pieces of CSI process information includes the process identifier of the CSI process information other than the CSI process information including the coordination indication information in the at least two pieces of CSI process information. Specific configuration is as follows:

```
CSI-IM-Config-r14 ::=         SEQUENCE {
    csi-IM-ConfigId-r14            CSI-IM-ConfigId-r14,
    setup   SEQUENCE(SIZE(1..4)) OF CSI-Process-ConfigId-r11
OPTIONAL,  -- Need ON
    resourceConfig-r14             INTEGER (0..31),
    subframeConfig-r14                     INTEGER (0..154),
    ...
}
```

According to description of the second aspect, each of the at least two pieces of configured CSI process information is an interference measurement resource (Interference Measurement Resource, IMR) of another piece of CSI process information.

When NZP CSI-RS type indication information, used for configuration, in NZP CSI-RS resource information of channel measurement in a process identifier of CSI process information in IM resource information indication signaling is a beamformed type, namely, a precoded type, a plurality of NZP CSI-RS resource information identifiers may be configured. An NZP CSI-RS resource corresponding to an NZP CSI-RS resource information identifier is used to perform at least one of channel measurement and interference measurement. However, when measuring interference corresponding to the CSI process information, the UE first selects NZP CRI corresponding to the CSI process information, obtains an RI and a PMI based on a channel measured based on an NZP CSI-RS resource corresponding to the CRI, and uses a signal formed after PMI processing is performed on the measured channel measured based on a CSI-RS on the NZP CSI-RS resource corresponding to the CRI as interference, to perform CQI calculation.

The CSI measurement configuration information further includes feedback indication information. The feedback indication information is used to instruct the UE to jointly feed back a plurality of pieces of correlated CSI, that is, jointly feed back CSI corresponding to CSI process information that is an IMR of each other. The feedback indication information may further indicate a feedback order of the plurality of pieces of correlated CSI, for example, indicate that feedback is performed in ascending order or descending order based on process identifiers of the CSI process information. The feedback indication information may further indicate content of each of the plurality of pieces of correlated CSI, for example, indicate that a piece of CSI includes a CQI and a PMI. The UE feeds back at least one group of CSI to the first network side device according to the feedback indication information. The at least one group of CSI is the plurality of pieces of correlated CSI. Compared with feeding back one group of CSI at a time, feeding back a plurality of groups of CSI at a time can reduce feedback latency and improve feedback efficiency, so that the first network side device can improve scheduling efficiency.

In one embodiment, when the NZP CSI-RS type indication information in the NZP CSI-RS resource information is a beamformed type, namely, a precoded type, corresponding NZP CRI may be fed back during CSI feedback. Reference may be made to CRI selection and reporting procedures in the prior art, and details are not described herein.

Based on the first aspect and the second aspect, in a case of CQI feedback, the CSI measurement configuration information further includes channel quality feedback indication information. The channel quality feedback indication information is used to instruct the UE to feed back a CQI based on single code word transmission. The first network side device may configure the channel signaling feedback indication information in new RRC layer signaling, and configuration is as follows:

transmission point transmits only one code word, the UE reports a single CQI based on an assumption that a single code word is corresponding to a plurality of layer transmission, and the CQI is unrelated to a value of a measured rank.

Figure 4:
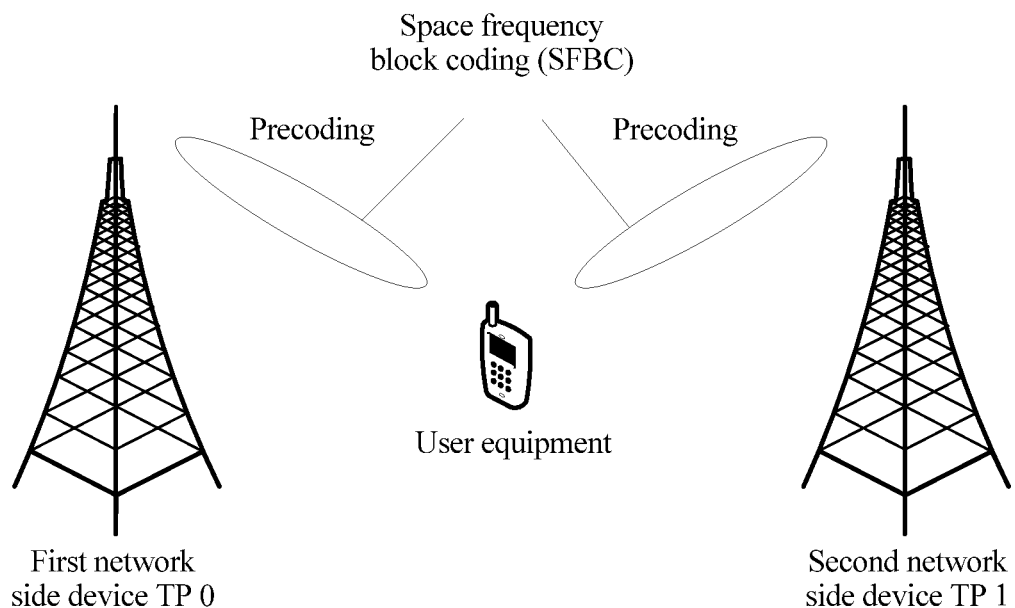
FIG. 4 is a schematic scenario diagram of coordinated multipoint diversity transmission according to an embodiment of the present invention.

FIG. 4 is a schematic scenario diagram of coordinated multipoint diversity transmission according to an embodiment of the present invention. Based on the coordinated multipoint diversity transmission, the following describes in detail the method for measuring and feeding back channel state information provided in an embodiment of the present invention.

For example, in FIG. 4, two network side devices perform coordinated multipoint diversity transmission. After independently performing precoding, the two network side devices perform SFBC coding on two beams and implement diversity transmission for UE, to improve transmission reliability. In this scenario, CSI measurement configuration information is configured as follows: It is assumed that a measurement set is 2, that is, two network side devices: a TP 0 and a TP 1, jointly perform measurement; and it is assumed that the TP 0 is the first network side device, namely, a serving base station of the UE, and the TP 1 is the second network side device, namely, a coordinating base station of the UE.

Different from the coordinated multipoint multi-stream transmission, in the coordinated multipoint diversity transmission, a coordination relationship between the serving network side device and the coordinating network side device is not an interference relationship, and is not a relationship between the network side devices established by using the interference relationship. In the coordinated multipoint diversity transmission, each network side device transmits a different layer of a modulation symbol corresponding to a same code word, and no interference exists between each other. For example, there are two network side devices. When measuring and calculating CSI, the UE first needs to obtain channel information of the two network side devices, and calculates the CSI after performing SFBC equivalent processing on the channel information. Therefore, to implement the measurement, the first network side device first needs to instruct the UE to perform measurement based on the coordinated multipoint diversity transmission,

```
        CSI-Process-r11 ::=            SEQUENCE {
            csi-ProcessId-r11           CSI-ProcessId-r11,
            csi-RS-ConfigNZPId-r11          CSI-RS-ConfigNZPId-r11,
            csi-IM-ConfigId-r11             CSI-IM-ConfigId-r11,
            p-C-AndCBSRList-r11         SEQUENCE (SIZE (1..2)) OF
P-C-AndCBSR-r11,
            cqi-ReportBothProc-r11              CQI-ReportBothProc-r11
        OPTIONAL,   -- Need OR
            cqi-ReportOneCode word-r14   CQI-ReportOneCode word-r14
OPTIONAL,   -- Need OR
            cqi-ReportPeriodicProcId-r11 INTEGER (0..maxCQI-ProcExt-r11)
        OPTIONAL,   -- Need OR
            cqi-ReportAperiodicProc-r11 CQI-ReportAperiodicProc-r11
        OPTIONAL,   -- Need OR
            ...
```

The bold part is used to instruct the UE to feed back the CQI based on single code word transmission. Existing CQI reporting is related to a value of a rank measured by the UE. When the rank is greater than 1, CQI feedback is performed based on an assumption of two code words (that is, each code word is corresponding to one CQI). In the coordinated multipoint multi-stream transmission, if each coordinated and then instruct the UE to perform measurement calculation based on the relationship between a plurality of network side devices.

The first network side device instructs the UE to perform measurement based on the coordinated multipoint diversity transmission by using measurement type indication information configured in RRC layer signaling. Alternatively, the first network side device instructs the UE to perform measurement based on the coordinated multipoint diversity transmission by using a transmission mode. The transmission mode may be a transmit-diversity related transmission mode, or a transmission mode corresponding to the coordinated multipoint diversity transmission (a new transmission mode that is set for the coordinated multipoint diversity transmission).

In the coordinated multipoint diversity transmission, the CSI measurement configuration information is configured according to two aspects. The first aspect includes three possible implementations, and the second aspect includes one possible implementation.

The first aspect includes the first and the second possible implementations of the first aspect described in the coordinated multipoint multi-stream transmission. In the third possible implementation of the first aspect, NZP CSI-RS resource information indication signaling in the one piece of CSI process information includes NZP CSI-RS resource information of each second network side device. The NZP CSI-RS resource information indication signaling in the CSI process information is configured as follows:

```
CSI-RS-ConfigNZPIdList-r14 ::= CHOICE {
    release        NULL,
    ...
    setup          SEQUENCE(SIZE(1..4)) OF
  CSI-RS-ConfigNZPId-r11 OPTIONAL, -- Need ON
    ...
}
```

Different from the third possible implementation of the first aspect described in the coordinated multipoint multi-stream transmission, where NZP CSI-RS resource information of another network side device is configured in NZP CSI-RS resource information indication signaling in the one piece of CSI process information. In this embodiment, NZP CSI-RS resource information of another network side device is configured in interference measurement resource information indication signaling in the one piece of CSI process information. There is no interference relationship in the multipoint diversity transmission, and therefore the NZP CSI-RS resource information of the another network side device is configured in the NZP CSI-RS resource information indication signaling in the one piece of CSI process information.

A difference between the second aspect of the coordinated multipoint diversity transmission and the second aspect of the coordinated multipoint multi-stream transmission lies in that, a plurality of pieces of CSI process information are IMRs of each other in the second aspect of the coordinated multipoint multi-stream transmission. However, in the second aspect of the coordinated multipoint diversity transmission, a plurality of pieces of CSI process information are NZP CSI-RSs of each other. NZP CSI-RS resource information indication signaling of at least one of the at least two pieces of CSI process information includes a process identifier of CSI process information other than CSI process information including the coordination indication information in the at least two pieces of CSI process information, used to instruct the UE to perform SFBC equivalent processing on CSI corresponding to these pieces of CSI process information during measurement. Specific configuration is as follows:

```
CSI-RS-ConfigNZPIdList-r14 ::= CHOICE {
    release        NULL,
    setup          SEQUENCE(SIZE(1..4)) OF
  CSI-Process-ConfigId-r11 OPTIONAL, -- Need ON
}
```

Feedback indication information in the coordinated multipoint diversity transmission is used to indicate one group of CSI fed back by the UE. The group of CSI includes a plurality of PMIs and one CQI. The one CQI is a CQI obtained by performing SFBC equivalent processing. The plurality of PMIs are a plurality of PMIs of a plurality of pieces of CSI process information, namely, a plurality of PMIs corresponding to a plurality of pieces of configured NZP CSI-RS resource information.

Figure 5:
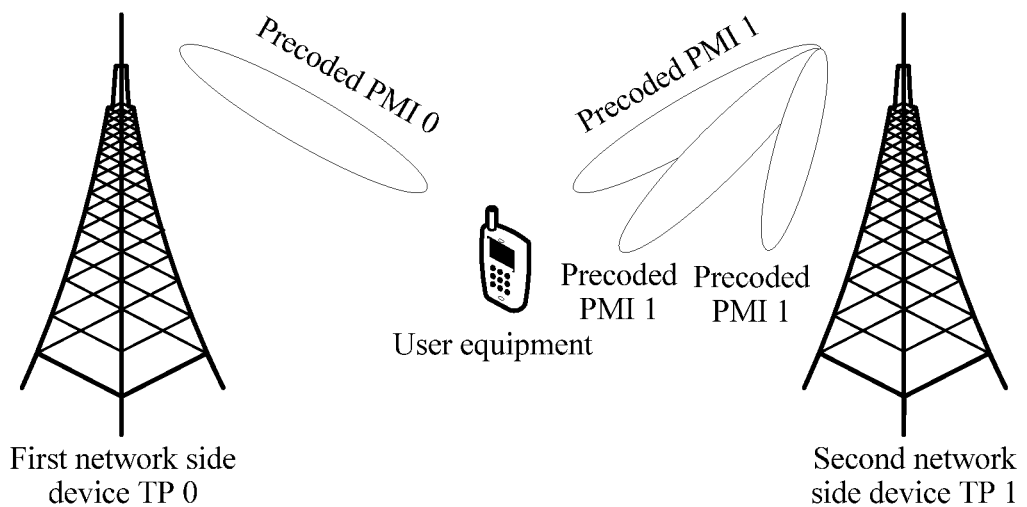
FIG. 5 is a schematic scenario diagram of interference coordination transmission according to an embodiment of the present invention.

FIG. 5 is a schematic scenario diagram of interference coordination transmission according to an embodiment of the present invention. Based on the interference coordination transmission, the following describes in detail the method for measuring and feeding back channel state information provided in an embodiment of the present invention.

For example, in FIG. 5, two network side devices perform interference coordination transmission. A measurement result of UE is used to assist a network side device in scheduling, including precoded matrix selection, user selection, and the like, so that neighboring network side devices cause minimum interference to the UE, thereby improving quality of user data transmission. In this scenario, CSI measurement configuration information is configured as follows: It is assumed that a measurement set is 2, that is, two network side devices: a TP 0 and a TP 1, jointly perform measurement; and it is assumed that the TP 0 is the first network side device, namely, a serving base station of the UE, and the TP 1 is the second network side device, namely, a coordinating base station of the UE.

In the interference coordination transmission scenario, configuration of CSI process information in CSI measurement configuration information is the same as configuration of CSI process information in the coordinated multipoint multi-stream transmission scenario. Reference may be made to detailed description of the configuration of the CSI process information in the coordinated multipoint multi-stream transmission scenario, and details are not described herein again.

Different from the coordinated multipoint multi-stream transmission scenario, feedback indication information in the interference coordination transmission scenario is different. Specifically, feedback group quantity indication information and feedback content indication information included in the feedback indication information are separately different.

For example, the feedback group quantity indication information indicates that there are at least two groups of CSI, at least one group of CSI, or one group of CSI, and the feedback content indication information indicates that content of the at least one group of CSI includes at least one group of first CSI and/or second CSI that are/is corresponding to the first network side device.

In one embodiment, any group of the at least one group of first CSI includes at least one piece of CSI measured based on at least one interference source of one second network side device. The at least one interference source is generated based on at least one PMI corresponding to the second network side device. The second CSI is CSI measured without regarding each second network side device as an interference source. Compositional elements of the CSI include at least one of a CQI, a PMI, and an RI. A group quantity of the at least one group of first CSI is the same as a quantity of the at least one second network side device. For example, there is one second network side device TP 1, the first network side device is a TP 0, the UE may feed back two groups of CSI, one group of CSI includes first CSI, and the other group of CSI includes second CSI. The second CSI includes at least one of a PMI 0, a CQI 0, and an RI 0 that are measured based on the TP 0. In other words, the second CSI is CSI measured without considering interference caused by the TP 1 to the TP 0. It is assumed that two interference sources are generated based on a PMI 11 and a PMI 12 of the TP 1, the first CSI includes at least one of a PMI 0', a CQI 0', and an RI 0' that are measured based on the PMI 11, and at least one of a PMI 0", a CQI 0", and an RI 0" that are measured based on the PMI 12. The feedback content indication information is further used to instruct the UE to feed back difference information. The difference information may include at least one of a difference between the CQI 0 and the CQI 0', a difference between the PMI 0 and the PMI 0', a difference between the RI 0 and the RI 0', a difference between the CQI 0 and the CQI 0", a difference between the PMI 0 and the PMI 0", a difference between the RI 0 and the RI 0", a difference between the CQI 0" and the CQI 0', a difference between the PMI 0" and the PMI 0', and a difference between the RI 0" and the RI 0'. The UE may feed back one group of CSI, and the group of CSI includes the first CSI or the second CSI. A case in which there are a plurality of second network side devices is deduced by analogy.

In another embodiment, any group of the at least one group of first CSI includes at least one piece of CSI measured based on interference sources of at least two second network side devices. The interference source is generated based on any one of at least one PMI corresponding to each of the at least two second network side devices. For example, there is one second network side device TP 1, the first network side device is a TP 0, the UE may feed back two groups of CSI, one group of CSI includes first CSI, and the other group of CSI includes second CSI. The second CSI includes at least one of a PMI 0, a CQI 0, and an RI 0 that are measured based on the TP 0. In other words, the second CSI is CSI measured without considering interference caused by the TP 1 to the TP 0. The first CSI includes at least one of a PMI 0', a CQI 0', and an RI 0' that are measured based on an interference source generated based on a PMI 1 corresponding to the TP 1. The feedback content indication information is further used to instruct the UE to feed back difference information. The difference information may include at least one of a difference between the CQI 0 and the CQI 0', a difference between the PMI 0 and the PMI 0', and a difference between the RI 0 and the RI 0'. A case in which there are a plurality of second network side devices is deduced by analogy.

For example, the feedback group quantity indication information indicates that there are at least two groups of CSI, and the feedback content indication information indicates that content of the at least two groups of CSI includes at least one group of first CSI and at least one group of second CSI that are corresponding to the first network side device. The at least one group of first CSI is CSI measured by using a specified PMI corresponding to each second network side device as one of interference sources, and the second CSI is CSI measured without using the specified PMI corresponding to each second network side device as one of interference sources. The specified PMI is a PMI measured based on NZP CSI-RS resource information of the corresponding second network side device. The CSI includes at least one of a PMI, a CQI, and an RI. A group quantity of the at least one group of first CSI is the same as a quantity of the at least one second network side device.

For example, there is one second network side device TP 1, the first network side device is a TP 0, and the UE feeds back two groups of CSI. One group of CSI includes first CSI, and the first CSI is at least one of a PMI 0, a CQI 0, and an RI 0 that are corresponding to the TP 0 and that are measured by the UE based on a specified PMI measured based on the TP 1. The other group of CSI includes second CSI, and the second CSI is at least one of a PMI 0', a CQI 0', and an RI 0' that are corresponding to the TP 0 and that are measured by the UE not based on the specified PMI measured based on the TP 1. The specified PMI is a PMI measured by the UE based on NZP CSI-RS resource information of the TP 1. The feedback content indication information is further used to instruct the UE to feed back difference information. The difference information may include at least one of a difference between the CQI 0 and the CQI 0', a difference between the PMI 0 and the PMI 0', and a difference between the RI 0 and the RI 0'. A case in which there are a plurality of second network side devices is deduced by analogy.

For example, the feedback group quantity indication information indicates that there are at least two groups of CSI, and the feedback content indication information indicates that content of each group of the at least two groups of CSI includes a PMI and an equivalent CQI. Alternatively, the feedback group quantity indication information indicates that there is one group of CSI, and the feedback content indication information indicates that content of the group of CSI includes an equivalent CQI and at least two PMIs. The equivalent CQI is a CQI obtained by the user equipment by performing equivalent processing based on a transmit-diversity related transmission mode. The PMI included in each group of the at least two groups of CSI is measured based on a corresponding network side device, and each of the at least two PMIs is measured based on a corresponding network side device.

For example, when the feedback group quantity indication information indicates that there are at least two groups of CSI, content of the at least one group of CSI that is indicated by the feedback content indication information further includes difference information. The difference information includes any group of CSI of the at least two groups of CSI and difference information between the any group of CSI and another group of CSI other than the any group of CSI.

The foregoing describes the method for measuring and feeding back channel state information provided in the embodiments of the present invention from the perspectives of the coordinated multipoint multi-stream transmission, the coordinated multipoint diversity transmission, and the interference coordination transmission, so that the UE performs measurement and feedback based on a coordination relationship between a plurality of network side devices, and content of CSI fed back by the UE is more consistent with actual transmitted CSI. This improves accuracy of measurement and feedback content, facilitates scheduling of a base station, and improves transmission performance. In addition, the UE may feed back a plurality of groups of CSI including a plurality of PMIs or one group of CSI including a plurality of PMIs, thereby reducing feedback latency and feedback overheads, and improving UE feedback efficiency. It should be noted that it is not limited to one transmission mode in actual application, and any combination of the three transmission modes may be used.

The solutions provided in the embodiments of the present invention are described above mainly from a perspective of interaction between devices. It may be understood that, to implement the foregoing functions, each device, for example, the user equipment and the network side device, includes a corresponding hardware structure and/or software module for performing the functions. A person of ordinary skill in the art should easily be aware that, in combination with the optional ways described in the embodiments disclosed in this specification, units and algorithms operations may be implemented by hardware or a combination of hardware and computer software. Whether a function is performed by hardware or hardware driven by computer software depends on particular applications and design constraints of the technical solutions. A person skilled in the art may use different methods to implement the described functions for each specified application, but it should not be considered that the implementation goes beyond the scope of the present invention.

In the embodiments of the present invention, the user equipment and the network side device may be divided into functional units based on the foregoing method embodiments. For example, the user equipment and the network side device may be divided into functional units in correspondence to functions, or at least two functions may be integrated into one processing unit. The integrated unit may be implemented in a form of hardware, or may be implemented in a form of a software functional unit. It should be noted that the unit division in the embodiments of the present invention is an optional way and merely logical function division, and may be other division in actual implementation.

Figure 6A:
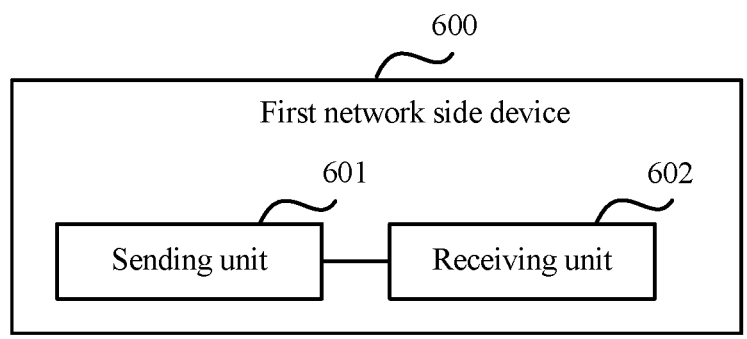
FIG. 6a is a schematic structural diagram of a first network side device according to an embodiment of the present invention.

FIG. 6a is a possible schematic structural diagram of a first network side device used in the foregoing embodiment. The first network side device 600 includes a sending unit 601 and a receiving unit 602.

The sending unit 601 is configured to send channel state information CSI measurement configuration information to user equipment. The CSI measurement configuration information includes coordination indication information, and the coordination indication information indicates that the first network side device and at least one second network side device are in a coordination relationship.

The receiving unit 602 is configured to receive at least one group of CSI fed back by the user equipment based on the CSI measurement configuration information.

It should be noted that the sending unit 601 is configured to perform 201 in the embodiment shown in FIG. 2, and the receiving unit 602 is configured to perform 205 in the embodiment shown in FIG. 2.

It should be noted that in actual application, the first network side device further includes a processing unit 603, not shown in FIG. 6a. The processing unit 603 is configured to configure one piece of CSI process information for the user equipment, where the one piece of CSI process information is used for configuration of the CSI measurement configuration information; or is configured to configure at least two pieces of CSI process information for the user equipment, where the at least two pieces of CSI process information are used for configuration of the CSI measurement configuration information. The processing unit 603 may be a processor or a controller. The processing unit 603 may implement or execute various logical blocks, modules, and circuits described with reference to content disclosed in the present invention. The sending unit 601 and the receiving unit 602 may be a transceiver, a transceiver circuit, a communications interface, or the like.

Figure 6B:
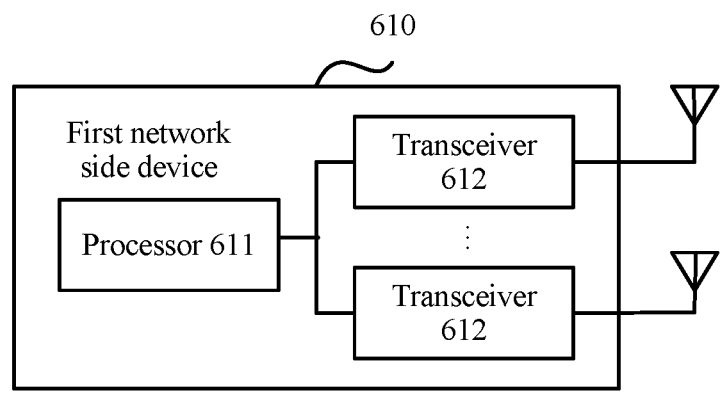
FIG. 6b is a schematic structural diagram of another first network side device according to an embodiment of the present invention.

When the processing unit 603 is the processor, and the sending unit 601 and the receiving unit 602 are the transceiver, the first network side device used in this embodiment of the present invention may be a first network side device shown in FIG. 6b.

Referring to FIG. 6b, the first network side device 610 includes a processor 611, a transceiver 612, and an antenna. It should be noted that in actual application, the transceiver 612 is not limited to two transceivers, and the antenna is also not limited to two antennas. A structure of the first network side device 610 does not constitute a limitation to this embodiment of the present invention. For a schematic structural diagram of a second network side device used in this embodiment of the present invention, also refer to FIG. 6b.

The processor 611 mainly includes four components: a cell controller, a voice channel controller, a signaling channel controller, and an extended multi-path interface. The processor 611 is responsible for all management of a mobile communications interface, which is mainly allocation, release, and management of a radio channel. The transceiver 612 includes a receiver and a transmitter. For user equipment, the transmitter 612 may transmit uplink data by using the transmitter and receive downlink data by using the receiver. The transceiver 612 is applied to this embodiment of the present invention, and is configured to implement functions of the sending unit 601 and the receiving unit 602 shown in FIG. 6a.

Figure 7A:
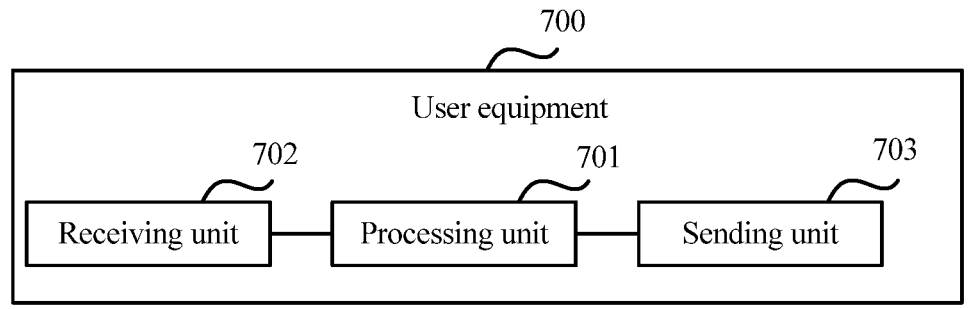
FIG. 7a is a schematic structural diagram of user equipment according to an embodiment of the present invention.

FIG. 7a is a possible schematic structural diagram of user equipment used in the foregoing embodiment. The user equipment 700 includes a receiving unit 701, a processing unit 702, and a sending unit 703.

The receiving unit 701 is configured to receive CSI measurement configuration information sent by a first network side device. The CSI measurement configuration information includes coordination indication information, and the coordination indication information indicates that the first network side device and at least one second network side device are in a coordination relationship.

The processing unit 702 is configured to perform measurement based on the CSI measurement configuration information.

The sending unit 703 is configured to feed back at least one group of CSI to the first network side device based on the CSI measurement configuration information.

It should be noted that the receiving unit 701 is configured to perform 202 in the embodiment shown in FIG. 2, the processing unit 702 is configured to perform 203 in the embodiment shown in FIG. 2, and the sending unit 703 is configured to perform 204 in the embodiment shown in FIG. 2.

The processing unit 702 may be a processor or a controller. For example, the processing unit 702 may be a central processing unit (CPU), a general purpose processor, a digital signal processor (DSP), an application-specific integrated circuit (ASIC), a field programmable gate array (FPGA) or another programmable logic device, a transistor logic device, a hardware device, or any combination thereof. The processing unit 702 may implement or execute various logical blocks, modules, and circuits described with reference to content disclosed in the present invention. Alternatively, the processor may be a combination of processors implementing a computing function, for example, a combination of one or more microprocessors, or a combination of the DSP and a microprocessor. The receiving unit 701 and the sending unit 703 may be a transceiver, a transceiver circuit, a communications module, or the like.

Figure 7B:
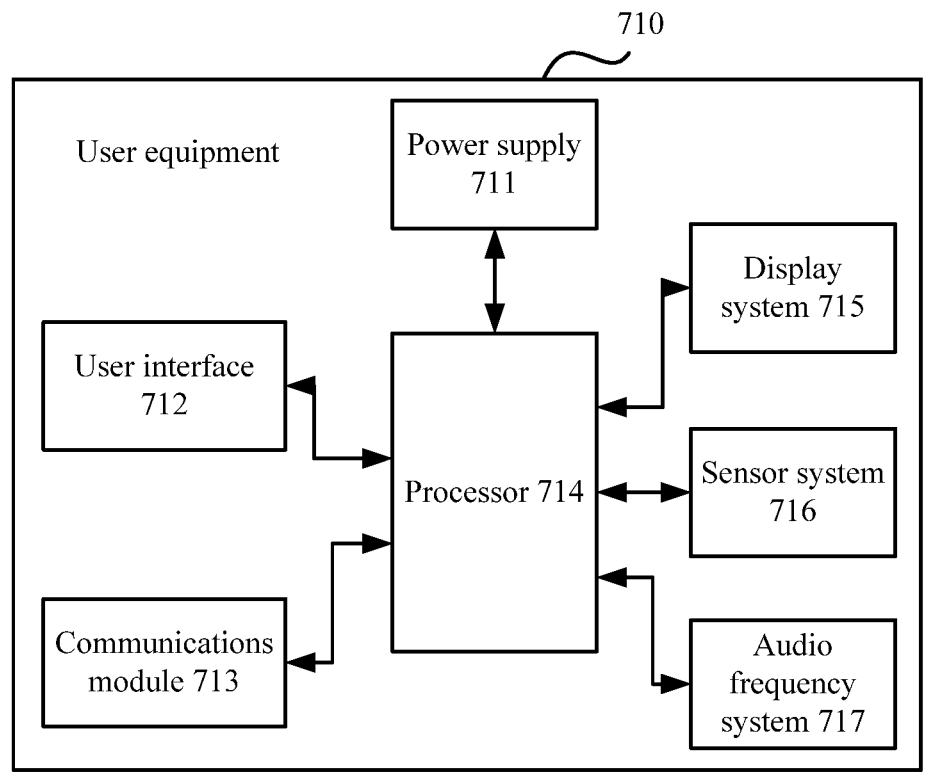
FIG. 7b is a schematic structural diagram of another user equipment according to an embodiment of the present invention.

When the processing unit 702 is the processor, and the receiving unit 701 and the sending unit 703 are the communications module, the user equipment used in this embodiment of the present invention may be user equipment shown in FIG. 7b.

Referring to FIG. 7b, the user equipment 710 includes a power supply 711, a user interface 712, a communications module 713, a processor 714, a display system 715, a sensor system 716, and an audio frequency system 717. It should be noted that a structure of the user equipment shown in FIG. 7b does not constitute a limitation to this embodiment of the present invention.

The power supply 711 supplies electric power for implementing various functions of the user equipment 710. The user interface 712 is configured to connect the user equipment 710 to another device or apparatus, to implement communication and data transmission between the another device or apparatus and the user equipment 710. The communications module 713 is configured to implement communication and data transmission between the user equipment 710 and a network side device such as a base station or a satellite, and is further configured to implement communication and data transmission between the user equipment 710 and another user equipment. Being applied to this embodiment of the present invention, the communications module 713 is configured to implement functions of the receiving unit 701 and the sending unit 703 shown FIG. 7a. The processor 714 may implement or execute various logical blocks, modules, and circuits described with reference to content disclosed in the present invention. Being applied to this embodiment of the present invention, the processor 714 is configured to implement functions of the processing unit 702 shown in FIG. 7a. The display system 717 is configured to display output information and receive a user input operation. The sensor system 716 includes various sensors such as a temperature sensor or a distance sensor. The audio frequency system 717 is configured to output an audio frequency signal.

An embodiment of the present invention further provides a computer storage medium, configured to store a computer software instruction used by the first network side device. The computer software instruction includes a program designed for executing the foregoing aspects.

An embodiment of the present invention further provides a computer storage medium, configured to store a computer software instruction used by the user equipment. The computer software instruction includes a program designed for executing the foregoing aspects.

An embodiment of the present invention further provides a system for measuring and feeding back channel state information, including the first network side device shown in FIG. 6a and the user equipment shown in FIG. 7a, or including the first network side device shown in FIG. 6b and the user equipment shown in FIG. 7b.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely embodiments of the present invention, and certainly is not intended to limit the protection scope of the present invention. Therefore, equivalent variations made in accordance with the claims of the present invention shall fall within the scope of the present invention.

What is claimed is:

1. An apparatus, comprising:
   a transmitter to send channel state information (CSI) measurement configuration information to user equipment, wherein the CSI measurement configuration information comprises coordination indication information and measurement type indication information to instruct the user equipment to perform a measurement based on a measurement type indicated by the measurement type indication information,
   wherein the measurement type is related to a coordinated transmission mode including coordinated multipoint multi-stream transmission, in which two or more than two transmission points send different code blocks respectively corresponding to different data streams to the user equipment and CSI of one of the different data streams is determined based on interferences from other data streams of the different data streams, and
   wherein the coordination indication information indicates that the apparatus or a first network side device which the apparatus is used for and at least one second network side device are in a coordination relationship, wherein the first network side device and the at least one second network side device are included in the two or more than two transmission points; and
   a receiver to receive at least one group of CSI fed back by the user equipment based on the CSI measurement configuration information; and
   a processor to configure one piece of CSI process information for the user equipment, the one piece of CSI process information including non-zero power CSI-RS resource information identifiers, wherein the one piece of CSI process information is used for configuration of the CSI measurement configuration information, and wherein non-zero power CSI-RS resources corresponding to the non-zero power CSI-RS resource information identifiers are used to perform at least one of channel measurement and interference measurement, and wherein the non-zero power CSI-RS resources indicate the coordination indication information.

2. The apparatus according to claim 1, wherein non-zero power CSI-RS resource information identifiers included in non-zero power CSI-RS resource information indication signaling in the one piece of CSI process information indicate the coordination indication information.

3. The apparatus according to claim 1, wherein non-zero power CSI-RS resource information identifiers included in interference measurement resource information indication signaling in the one piece of CSI process information indicate the coordination indication information.

4. The apparatus according to claim 1, wherein CSI-RS pattern information included in enhanced signaling in non-zero power CSI-RS resource information indication signaling in the one piece of CSI process information indicates the coordination indication information.

5. The apparatus according to claim 1, wherein
   the processor is further to configure at least two pieces of CSI process information for the user equipment, wherein the at least two pieces of CSI process information are used for configuration of the CSI measurement configuration information, wherein at least one of the at least two pieces of CSI process information comprises the coordination indication information, and wherein the coordination indication information comprises a process identifier of CSI process information other than CSI process information comprising the coordination indication information in the at least two pieces of CSI process information.

6. The apparatus according to claim 5, wherein the process identifier that is of CSI process information other than the CSI process information comprising the coordination indication information in the at least two pieces of CSI process information and that is comprised in interference measurement resource information indication signaling in the at least one piece of CSI process information is used to indicate the coordination indication information.

7. The apparatus according to claim 5, wherein the process identifier of CSI process information other than the CSI process information comprising the coordination indication information in the at least two pieces of CSI process information included in non-zero power CSI-RS resource information indication signaling in the at least one piece of CSI process information is used to indicate the coordination indication information.

8. The apparatus according to claim 1, wherein the coordinated transmission mode comprises at least one of coordinated multipoint diversity transmission and interference coordination transmission.

9. The apparatus according to claim 1, wherein the CSI measurement configuration information further comprises feedback indication information used to instruct the user equipment to feed back the at least one group of CSI to the apparatus or the first network side device, wherein the feedback indication information comprises feedback group quantity indication information and feedback content indication information, wherein the feedback group quantity indication information is used to indicate a group quantity of the at least one group of CSI, and wherein the feedback content indication information is used to indicate content of the at least one group of CSI.

10. A communications method, comprising:
sending channel state information (CSI) measurement configuration information to user equipment, wherein the CSI measurement configuration information comprises coordination indication information and measurement type indication information to instruct the user equipment to perform a measurement based on a measurement type indicated by the measurement type indication information,
wherein the measurement type is related to a coordinated transmission mode including coordinated multipoint multi-stream transmission, in which two or more than two transmission points send different code blocks corresponding to different data streams to the user equipment and CSI of one of the different data streams is determined based on interferences from other data streams of the different data streams, and
wherein the coordination indication information indicates that a first network side device which a processor is used for and at least one second network side device are in a coordination relationship, wherein the first network side device and the at least one second network side device are included in the two or more than two transmission points;
receiving at least one group of CSI fed back by the user equipment based on the CSI measurement configuration information; and
configuring one piece of CSI process information for the user equipment, the one piece of CSI process information including non-zero power CSI-RS resource information identifiers, wherein the one piece of CSI process information is used for configuration of the CSI measurement configuration information, and wherein non-zero power CSI-RS resources corresponding to the non-zero power CSI-RS resource information identifiers are used to perform at least one of channel measurement and interference measurement, and wherein the non-zero power CSI-RS resources indicate the coordination indication information.

11. The method according to claim 10, further comprising:
configuring at least two pieces of CSI process information for the user equipment, wherein the at least two pieces of CSI process information are used for configuration of the CSI measurement configuration information, wherein at least one of the at least two pieces of CSI process information comprises the coordination indication information, and wherein the coordination indication information comprises a process identifier of CSI process information other than CSI process information comprising the coordination indication information in the at least two pieces of CSI process information.

12. An apparatus, comprising:
a receiver, configured to receive channel state information (CSI) measurement configuration information from a first network side device, wherein the CSI measurement configuration information comprises coordination indication information and measurement type indication information to instruct a user equipment to perform a measurement based on a measurement type indicated by the measurement type indication information, wherein the coordination indication information indicates that the first network side device and at least one second network side device are in a coordination relationship and the measurement type is related to a coordinated transmission mode including coordinated multipoint multi-stream transmission, in which two or more than two transmission points, being the first network side device and the at least one second network side device, send different code blocks respectively corresponding to different data streams to the user equipment and CSI of one of the different data streams is determined based on interferences from other data streams of the different data streams;
a processor, configured to receive the different data streams and perform measurement based on the CSI measurement configuration information, wherein CSI of one of the different data streams is determined based on interferences from other data streams of the different data streams; and
a transmitter, configured to feed back at least one group of CSI to the first network side device based on the CSI measurement configuration information;
wherein the CSI measurement configuration information comprises non-zero power CSI resource information identifiers related to one piece of CSI process, the non-zero power CSI resource information identifiers related to the one piece of CSI process indicate the coordination indication information and non-zero power CSI-RS resources corresponding to the non-zero power CSI-RS resource information identifiers are used to perform at least one of channel measurement and interference measurement.

13. The apparatus according to claim 12, wherein the CSI measurement configuration information further comprises feedback indication information, and the feedback indication information comprises feedback group quantity indication information and feedback content indication information;
- the processor is further configured to determine, according to the feedback group quantity indication information, a group quantity of the at least one group of CSI fed back to the first network side device;
- the processor is further configured to determine content of the at least one group of CSI according to the feedback content indication information; and
- the transmitter is configured to feed back the at least one group of CSI to the first network side device based on the determined group quantity and content of the at least one group of CSI.

14. A communications method, comprising:
- receiving channel state information (CSI) measurement configuration information from a first network side device, wherein the CSI measurement configuration information comprises coordination indication information and measurement type indication information to instruct a user equipment to perform a measurement based on a measurement type indicated by the measurement type indication information, wherein the coordination indication information indicates that the first network side device and at least one second network side device are in a coordination relationship and the measurement type is related to a coordinated transmission mode including coordinated multipoint multi-stream transmission, in which two or more than two transmission points, being the first network side device and the at least one second network side device, send different code blocks respectively corresponding to different data streams to the user equipment and CSI of one of the different data streams is determined based on interferences from other data streams of the different data streams;
- receiving different data streams and perform measurement based on the CSI measurement configuration information, wherein CSI of one of the different data streams is determined based on interferences from other data streams of the different data streams; and
- feeding back at least one group of CSI to the first network side device based on the CSI measurement configuration information;
- wherein the CSI measurement configuration information comprises non-zero power CSI resource information identifiers related to one piece of CSI process, the non-zero power CSI resource information identifiers related to the one piece of CSI process indicate the coordination indication information and non-zero power CSI-RS resources corresponding to the non-zero power CSI-RS resource information identifiers are used to perform at least one of channel measurement and interference measurement.

15. The method according to claim 14, wherein the CSI measurement configuration information further comprises feedback indication information, and the feedback indication information comprises feedback group quantity indication information and feedback content indication information;
- the feeding back at least one group of CSI to the first network side device based on the CSI measurement configuration information comprises:
- determining, according to the feedback group quantity indication information, a group quantity of the at least one group of CSI fed back to the first network side device;
- determining content of the at least one group of CSI according to the feedback content indication information; and
- feeding back the at least one group of CSI to the first network side device based on the determined group quantity and content of the at least one group of CSI.

* * * * *